United States Patent Office 3,560,506
Patented Feb. 2, 1971

3,560,506
SUBSTITUTED 7-[DI(LOWER ALKOXY)METHYL]- AND 7-(LOWER ALKYLENEDIOXYMETHYL)-7,8-DIHYDRO-6-METHOXY-6,14-ENDO- (ETHENO OR ETHANO) CODIDES AND MORPHIDES
John Johnson Brown, Pearl River, N.Y., Robert Allis Hardy, Jr., Ridgewood, N.J., and Carol Nora Roth, Née Carol Therese Nora, Houston, Tex., assignors to American Cyanamid Company, Stamford, Conn., a corporation of Maine
No Drawing. Continuation-in-part of application Ser. No. 671,128, Sept. 27, 1967, which is a continuation-in-part of application Ser. No. 634,099, Apr. 27, 1967. This application May 15, 1969, Ser. No. 825,053
Int. Cl. C07d 43/28; A61k 27/00
U.S. Cl. 260—285
10 Claims

ABSTRACT OF THE DISCLOSURE

This disclosure describes compounds of the class of substituted 7-[di(lower alkoxy)methyl]- and 7-(lower alkylenedioxymethyl) - 7,8 - dihydro-6-methoxy-6,14-endo-(etheno or ethano) codides and morphides which possess analgesic activity.

CROSS REFERENCE TO RELATED APPLICATIONS

This application is a continuation-in-part of our co-pending application Ser. No. 671,128, filed Sept. 27, 1967, which is a continuation-in-part of our application Ser. No. 634,099, filed Apr. 27, 1967, both now abandoned.

BRIEF SUMMARY OF THE INVENTION

This invention relates to novel substituted 7-[di(lower alkoxy)methyl] - 7,8-dihydro-6-methoxy-6,14-endo- (etheno or ethano) codides and morphides and to novel substituted 7 - (lower alkylenedioxymethyl)-7,8-dihydro-6-methoxy-6,14-endo- (etheno or ethano) codides and morphides and to novel methods of preparing these compounds. The novel compounds of the present invention may be represented by the following general formulae:

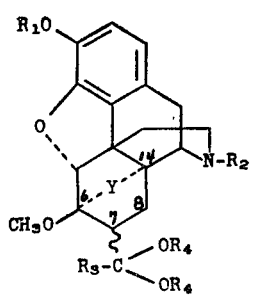

(I)

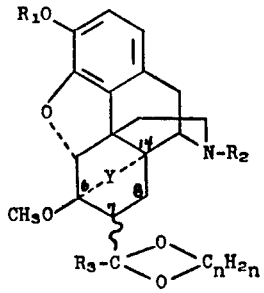

(II)

wherein $R_1$ is hydrogen, lower alkyl or lower alkanoyl; $R_2$ is hydrogen, cyano, propargyl, lower alkyl, phenyl lower alkyl, lower alkenyl or lower cycloalkylmethyl; $R_3$ is hydrogen, phenyl or alkyl of from 1 to 8 carbon atoms; $R_4$ is lower alkyl; $n$ is 2 or 3; and Y is etheno or ethano. Suitable lower alkyl and lower alkanoyl groups contemplated by the present invention are those having from 1 to 4 carbon atoms such as methyl, ethyl, isopropyl, n-butyl, formyl, acetyl, propionyl, isobutylryl, etc. Typical alkyl groups of from 1 to 8 carbon atoms are, for example, methyl, ethyl, n-propyl, n-butyl, isoamyl, sec.-hexyl, n-heptyl, isooctyl, etc. Suitable lower alkenyl groups are those having up to about 6 carbon atoms such as, for example, allyl, methallyl, dimethallyl, and the like. Suitable lower cycloalkylmethyl groups are those having from 4 to 7 carbon atoms such as cyclopropylmethyl, cyclobutylmethyl, cyclopentylmethyl, etc. Phenyl lower alkyl is exemplified by benzyl, α-phenylethyl, β-phenylethyl, and the like. Suitable lower alkylenedioxy groups may be, for example, ethylenedioxy, propylenedioxy, and the like having 2 or 3 carbon atoms.

DETAILED DESCRIPTION OF THE INVENTION

The novel compounds of the present invention are generally obtainable as crystalline materials having characteristic melting points and absorption spectra. They are appreciably soluble in many organic solvents such as ethanol, chloroform, benzene, ethyl acetate, and the like. They are, however, generally insoluble in water.

The organic bases of this invention form nontoxic acid-addition salts with a variety of organic and inorganic salt-forming agents. Thus, acid-addition salts, formed by admixture of the organic free base with the equivalent amount of an acid, suitably in a neutral solvent, are formed with such acids as sulfuric, phosphoric, hydrochloric, hydrobromic, citric, lactic, tartaric, acetic, gluconic, ascorbic, and the like. Also included within the purview of the present invention are the alkali metal salts (e.g., sodium and potassium) of the organic free bases when $R_1$ in the above general formula is hydrogen. For purposes of this invention, the organic free bases are equivalent to their nontoxic acid-addition salts and their alkali metal salts.

The 7-[di(lower alkoxy)methyl]-7,8-dihydro-6-methoxy-6,14-endo- (etheno or ethano) codides and morphides (I) of the present invention may be readily prepared from an appropriately substituted 7-formyl-, 7-alkanoyl- or 7-benzoyl-7,8-dihydro - 6 - methoxy-6,14-endo- (etheno or ethano) codide (III) in accordance with the following reaction scheme:

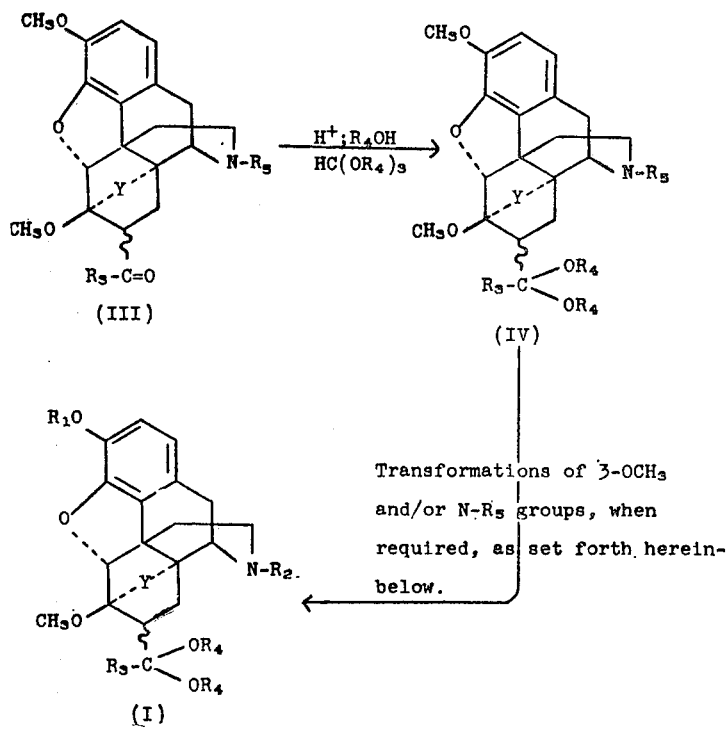

wherein $R_1$, $R_2$, $R_3$, $R_4$ and Y are as hereinabove defined and $R_5$ is hydrogen, cyano, propargyl, lower alkyl, lower alkenyl, phenyl lower alkyl or lower cycloalkylcarbonyl. By this procedure, a 7-formyl-, 7-alkanoyl- or 7-benzoyl-7,8-dihydro-6-methoxy-6,14-endo- (etheno or ethano) codide (III) is treated with a suitable acid and a lower alkanol ($R_4$OH), generally in the presence of its corresponding tri(lower alkyl)orthoformate ester $$[HC\!-\!(OR_4)_3]$$

(e.g., methanol and trimethyl orthoformate, ethanol and triethyl orthoformate, etc.). This reaction is conveniently carried out in an excess of the lower alkanol as the solvent, although in other cases an inert solvent such as benzene is used. The preferred temperature range is from about 15° C. to about 100° C., over a period of time of from about several minutes to 24 hours or more. Suitable acids include, for example, perchloric acid, p-toluenesulfonic acid, sulfuric acid, hydrochloric acid, and the like. A preferred procedure is the reaction of the 7-acyl derivative (III) with perchloric acid and the lower alkanol-tri-(lower alkyl)orthoformate mixture (especially methanol-trimethyl orthoformate) at room temperature for about 5–10 minutes, at which time the transformation is substantially complete. The 7-formyl-, 7-alkanoyl- and 7-benzoyl-6-methoxy codides (III) required as intermediates are readily obtained as described by K. W. Bentley et al., J. Org. Chem. 23, 1925 (1958), and J. Am. Chem. Soc. 89, 3267, 3273 (1967).

The novel 7-(lower alkylenedioxymethyl)-7,8-dihydro-6-methoxy-6,14-endo- (etheno or ethano) codides and morphides (II) of the present invention may be readily prepared from an appropriately substituted 7-formyl-, 7-alkanoyl- or 7-benzoyl-7,8-dihydro-6-methoxy-6,14-endo- (etheno or ethano) codide (III) in accordance with the following reaction scheme:

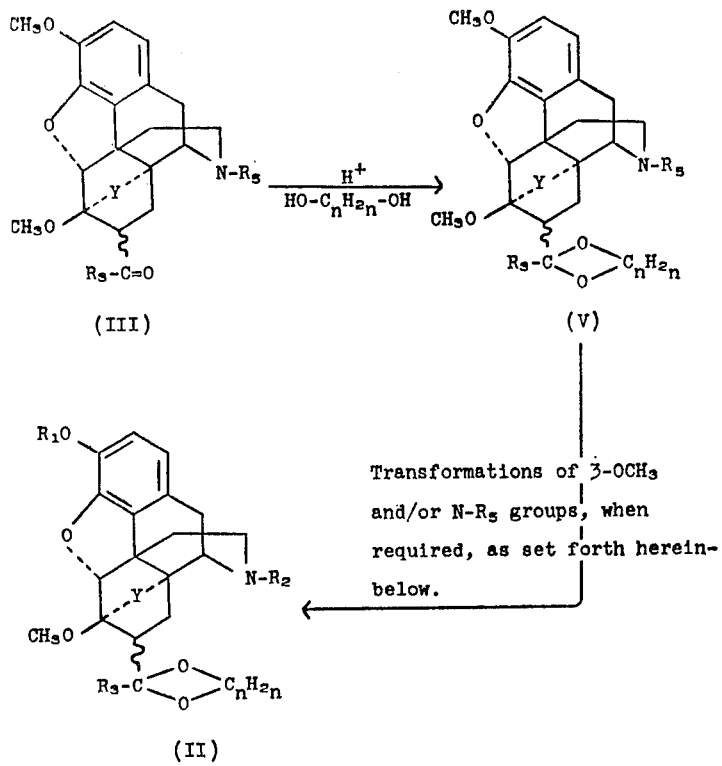

wherein $R_1$, $R_2$, $R_3$, $n$ and $Y$ are as hereinabove defined and $R_5$ is hydrogen, cyano, propargyl, lower alkyl, lower alkenyl, phenyl lower alkyl or lower cycloalkylcarbonyl. By this procedure, a 7-formyl-, 7-alkanoyl- or 7-benzoyl-7,8-dihydro-6-methoxy-6,14-endo- (etheno or ethano) codide (III) is treated with a suitable acid and a lower alkylene glycol (e.g., ethylene glycol, 1,2-propanediol, 1,3-propanediol, etc.). This reaction is conveniently carried out in an inert solvent such as benzene. The preferred temperature range is from about 15° C. to about 100° C., over a period of time of from about several minutes to 24 hours or more. Suitable acids include, for example, perchloric acid, p-toluenesulfonic acid, sulfuric acid, hydrochloric acid, and the like. A preferred procedure is the reaction of the 7-acyl derivative (III) with ethylene glycol and p-toluenesulfonic acid in benzene solution at about 80° C. for 20–24 hours, at which time the transformation is substantially complete. The 7-formyl-, 7-alkanoyl- and 7-benzoyl-6-methoxycodides (III) required as intermediates are readily obtained as described by K. W. Bentley et al., J. Org. Chem. 23, 1925 (1958), and J. Am. Chem. Soc. 89, 3267, 3273 (1967).

Inherent in the above described general preparative schemes for the novel compounds of the present invention are transformations of the 3-substituent ($R_1$) and/or transformations of the N-substituent ($R_2$). For example, the 3-methoxy derivatives (IV and V; codide series) may be transformed to 3-hydroxy derivatives (I and II; $R_1$=H; morphide series) by heating with an alkali metal hydroxide in diethylene glycol. A particular advantage of this transformation is the fact that the C–19 ketal group (in IV and V; the C–19 carbon being bonded to the C–7 carbon) is unaffected during this reaction with alkali at an elevated temperature; these transformations are, therefore, included within the purview of the present invention. Similar treatment of C–7 ketones (such as III) with alkaline reagents has produced molecular rearrangements in which the 7-ketone group is altered. Thus, the alkaline transformation of a 3-alkoxy group to a 3-hydroxy group in the presence of a C–19 ketal, and the products produced therefrom, represent particularly desirable features of the present invention. This reaction is generally carried out at a temperature range of from about 150° C. to about 240° C., the range of from about 200° C. to about 220° C. being preferred. Heating is continued until the reaction is substantially complete, generally from about several minutes to several hours or more. Suitable metal hydroxides include potassium hydroxide, sodium hydroxide, and the like. 3-alkanoyl morphides are obtained upon treatment of the above produced 3-hydroxy derivatives with alkanoic anhydrides such as acetic anhydride, propionic anhydride and the like.

Transformations of the N-substituent ($R_2$) are also useful methods for the compounds of this invention; and for certain examples are the preferred method of synthesis; these transformations are, therefore, included within the purview of the present invention. The N-methyl derivatives (codides and morphides; $R_2$=$CH_3$) may be treated with cyanogen halides using procedures well known to those skilled in the art. N-cyano derivatives ($R_2$=CN) within the scope of this invention are thereby obtained. Hydrolysis of the N-cyano derivatives by heating with a metal hydroxide in diethylene glylcol may then be employed to produce norcodides and normorphides ($R_2$=H). This procedure is particularly advantageous in that the C–19 ketal group (in IV and V) is unaffected by treatment with alkali at an elevated temperature. Similar treatment of C–7 ketones (such as III) with alkaline reagents has produced molecular rearrangements in which the C–7 ketone is a reactive moiety. Thus, the alkaline hydrolysis of an N-cyano group to an NH group in the presence of a C–19 ketal, and the products produced therefrom, represent particularly desirable features of the present invention. This reaction is generally carried out at a temperature of from about 130° C. to about 240° C., and the range of from about 150° C. to about 180° C. is preferred. In the preferred temperature range, hydrolysis of the N-cyano group proceeds readily without extensive transformation of a 3-methoxy group (if present). At higher temperatures, that is in the range of from about 200° C. to about 220° C., concomitant hydrolysis of both N-cyano and 3-methoxy groups takes place; this procedure which simultaneously transforms an N-cyano group and a 3-methoxy group is, therefore, the preferred method of synthesis for certain examples of this invention. Heating is continued until the reaction is substantially complete, generally from about several minutes to several hours or more. Suitable metal hydroxides include potassium hydroxide, sodium hydroxide, and the like. These norcodides and normorphides containing the secondary amine moiety are then realkylated wtih a suitable alkyl, cycloalkylmethyl, phenyl lower alkyl or propargyl halide or equivalent using procedures well known to those skilled in the art. Suitable alkylating agents include ethyl iodide, propargyl tosylate, benzyl chloride, phenethyl bromide, allyl bromide, methallyl bromide, dimethallyl bromide and the like.

N-cycloalkylmethyl derivatives are conveniently obtained from the nor-compounds by acylation with cycloalkylcarbonyl halides followed by reduction with lithium aluminum hydride. Suitable reactants are cyclopropanecarbonyl chloride, cyclobutanecarbonyl bromide, and the like. Another especially desirable feature of the present invention is the fact that lithium aluminum hydride reduction of the cycloalkylcarbonyl amides proceeds readily, while the C–19 ketal groups are unaffected. Similar reduction of N-cycloalkylcarbonyl groups in compounds containing a C–7 ketone group (i.e., III; $R_5$=cyclopropylcarbonyl and $R_3$=methyl) is not possible without concomitant reduction of the ketone.

The novel products of the present invention are useful and valuable as analgesic agents which may show a variety of types of analgesic activity within the general scope of analgesic or antinociperceptive actions. These include morphine-like modes of action; nonnarcotic analgesic modes of action; and analgesic antagonist modes of action. The overall analgesic activity of a given compound within the scope of the present invention may be readily determined by applying one or more of the routine tests described hereinbelow. The specific type of analgesic activity of a given compound may then be judged by those skilled in the art from the combined results of these several test procedures.

The novel compounds of the present invention are active analgesics when measured by the "writhing syndrome" test for analgesic activity as described by Siegmund et al., Proc. Soc. Exptl. Biol. Med., vol. 95, p. 729 (1957), with modifications. This method is based upon the reduction of the number of writhes following the intraperitoneal injection of one mg./kg. of body weight of phenyl-p-quinone in male Swiss albino mice weighing 15–25 grams per mouse. The syndrome is characterized by intermittent contractions of the abdomen, twisting and turning of the trunk, and extension of the hind legs beginning 3 to 5 minutes after injection of the phenyl-p-quinone. The test compound is administered orally to groups of two mice each 30 minutes before injection of the phenyl-p-quinone. The total number of writhes exhibited by each group of mice is recorded for a 3-minute period commencing 15 minutes after injection of the phenyl-p-quinone. A compound is considered active if it reduces the total number of writhes in two test mice from a control value of approximately 30 per pair to a value of 18 or less. In a representative operation, and merely by way of illustration, 7α-(1,1-dimethoxyethyl)-6,7,8,14-tetrahydro-6,14-endoethenothebaine showed analgesic activity when tested by this procedure at an oral dose of 100 mg./kg. of body weight whereas 7α-(1,1-ethylenedioxyethyl) - 7,7,8,14 - tetrahydro-6,14-endoethenothebaine, 7α - (1,1 - dimethoxyethyl)-6,7,8,14-tetrahydro-6,14-endoethenooripavine, 7α-(1,1 - dimethoxyethyl)-6,7,8,14-tetrahydro - 6,14 - endoethenonorthebaine and N-cyclopropylmethyl - 7α - (1,1-dimethoxyethyl) - 6,7,8,14 - tetrahydro-6,14-endoethenonororipavine all showed analgesic activity when tested by this procedure at an oral dose of 25 mg./kg. of body weight. If desired, the median effective dose ($ED_{50}$) for any particular compound may be calculated from the results obtained by repeating this test in multiple groups of two mice each of several graded dose levels.

A supplementary procedure which also indicates an analgesic mode of action is the rat tail-flick method describe by F. E. d'Amour and D. L. Smith, J. Pharmacol. Exptl. Therap., vol. 72, p. 74 (1941), with modifications. The compounds (generally as hydrochloric salts in 0.9% saline) are administered subcutaneously to groups of 5 rats each. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesia is an approximate 100% increase in response time over controls. Established clinically active analgesics such as meperidine, codeine, morphine, etc., are active in the above test. When tested by this procedure, certain compounds of the present invention show this type of analgesic action. For example, 7α-(1,1-ethylenedioxyethyl)- 6,7,8,14-tetrahydro-6.14-endoethenothebaine and 7α-(1,1-dimethoxyethyl) - 6,7,8,14 - tetrahydro-6,14-endoethenooripavine both show morphine-like analgesic activity when so tested at a dose of about 5 mg./kg. and about 0.5 mg./kg., respectively, of body weight subcutaneously.

Additionally, supplementary routine tests known to those skilled in the art may be carried out to assess the importance of side effects frequently associated with the morphine-like analgesics. These include such actions as onset and duration of action, development of tolerance, respiratory depression, addiction liability, relative effects by oral and parenteral administration, and inhibitory effects on the gastrointestinal system.

Other compounds of this invention may show analgesic antagonist activity when tested against a selected dose of morphine or other morphine-like agents. This antagonist activity may be considered useful as a specific antidote for an overdose of a morphine-like agent, or for its nonnarcotic analgesic action. Experience has shown that such narcotic antagonists may also be capable of relieving pain despite the fact that they may be inactive in the rat tail-flick procedure (see above), and have little or no addiction hazard; see L. S. Harris and A. K. Pierson, J. Pharmacol. Exptl. Therap., vol. 143, p. 141 (1964). Analgesics which produce satisfactory pain-relief without serious side effects, particularly with regard to the tolerance, habituation and drug dependence of the opiates, have been sought for many years. When tested against morphine by a procedure similar to that described by Harris and Pierson (supra), N-cyclopropylmethyl-7α-(1,1-dimethoxyethyl)-6,7,8,14-tetrahydro-6,14 - endoethenonororipavine showed analgesic antagonist activity at a dose of about 0.03 mg./kg. of body weight subcutaneously.

In addition, supplementary test procedures such as measuring the elevation of the pain threshold of rat paws inflamed with brewer's yeast may be carried out to confirm the analgesic action of the novel compounds of the present invention. In certain cases, these compounds also show antiinflammatory activity.

When mixed with suitable excipients or diluents, the compounds of this invention can be prepared as pills, capsules, tablets, powders, solutions, suspensions and the like for unit dosage, and to simplify administration. As analgesics they will relieve pain by direct action of the nerve centers or by diminishing the conductivity of the sensory nerve fibers. The novel compounds of the present invention may also be administered in combination therapy with salicylates such as aspirin and the like.

A preferred embodiment of the present invention consists of novel compounds which may be represented by the following general formula:

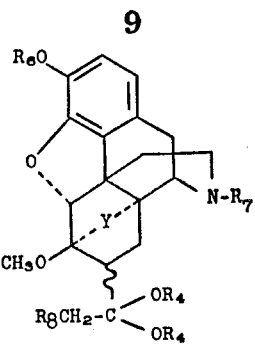

wherein $R_6$ is hydrogen or methyl; $R_7$ is hydrogen, cyano, methyl, lower alkenyl or lower cycloalkylmethyl; $R_8$ is hydrogen or alkyl of from 1 to 4 carbon atoms; and $R_4$ and Y are as hereinabove defined. The novel compounds of the preferred embodiment of the present invention are also valuable intermediates for the preparation of a variety of classes of active analgesics in accordance with the following reaction scheme:

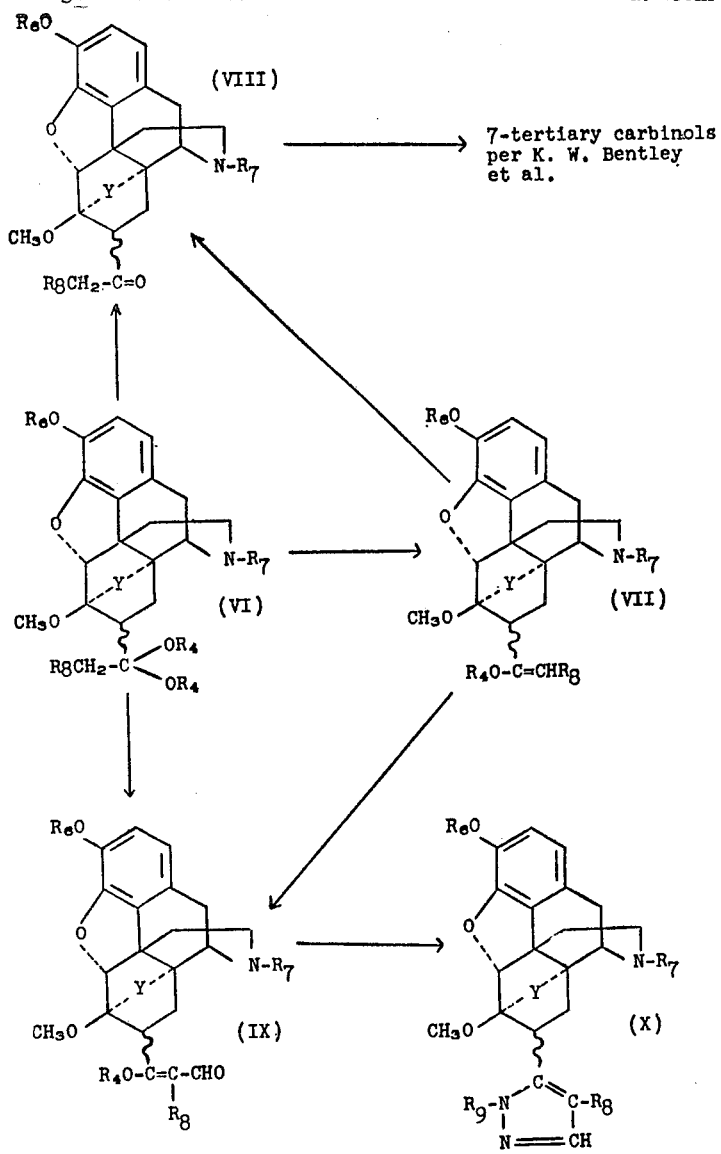

wherein $R_4$, $R_6$, $R_7$, $R_8$ and Y are as hereinabove defined with the proviso that in the case of the 7-ketones (VIII) when $R_6$ is methyl then $R_7$ is lower cycloalkylmethyl; and $R_9$ is hydrogen, lower alkyl, phenyl, halophenyl, lower alkylphenyl, lower alkoxyphenyl or trifluoromethylphenyl. Suitable lower alkyl and lower alkoxy groups are those having from 1 to 4 carbon atoms such as methyl, ethyl, isopropyl, n-butyl, methoxy, ethoxy, n-propoxy, n-butoxy, etc. Suitable halophenyl groups are, for example, m-fluorophenyl, p-chlorophenyl, m-chlorophenyl, m-bromophenyl, o-chlorophenyl, 2,5 - dichlorophenyl, 2,4,6 - trichlorophenyl, 3,5-dichlorophenyl, 2,6-dibromophenyl, pentafluorophenyl, etc. Suitable lower alkylphenyl groups are, for example, p-tolyl, m-tolyl, o-tolyl, p-ethylphenyl, p-isopropylphenyl, m-isobutylphenyl, etc. Suitable lower alkoxyphenyl groups are, for example, m-methoxyphenyl, o-methoxyphenyl, m-ethoxyphenyl, p-isopropoxyphenyl, etc.

In accordance with the above reaction scheme, a 7-[1,1-di(lower alkoxy)alkyl] - 7,8 - dihydro-6-methoxy-6,14-endo- (etheno or ethano) codide or morphide derivative (VI) of the present invention is readily converted to the corresponding 7-alkanoyl derivative (VIII) by hydrolysis under acidic conditions. Dilute aqueous acids including hydrochloric, sulfuric, phosphoric, trifluoroacetic, and the like are generally used, and the conversion is substantially complete within a few minutes at room temperature. Alternatively, the 7-ketal derivative (VI) may be readily converted to the corresponding 7-(1-alkoxy-1-alken-1-yl) - 7,8 - dihydro-6-methoxy-6,14-endo- (etheno or ethano) codide or morphide derivative (VII) by heating the 7-ketal derivative (VI) above its melting point. This reaction is carried out at from about 150° C. to about 250° C. A preferred temperature is about 200° C. This conversion is generally carried out in the absence of any solvent, and requires from a few minutes to an hour or more for substantial completion. Subsequently, the 7-enol ether derivative (VII) may also be readily transformed to the corresponding 7-alkanoyl-7,8 - dihydro-6-methoxy - 6,14 - endo- (ethano or ethano) codide or morphide derivative (VIII) by hydrolysis with dilute acid. Dilute aqueous acids including hydrochloric, sulfuric, phosphoric, trifluoroacetic, and the like are generally used and this transformation is substantially complete within a few minutes at room temperature. The 7-alkanoyl derivatives (VIII) may then be readily transformed to the corresponding 7-tertiary carbinols, a class of active analgesics, in accordance with the methods described by K. W. Bentley et al., Proc. Chem. Soc., 220 (1963) and J. Am. Chem. Soc. 89, 3273, 3281 (1967).

Further in accordance with the above reaction scheme, a 7-ketal derivative (VI) may be readily converted to the corresponding 7-(2-formyl-1-alkoxyvinyl) - 7,8-dihydro-6-methoxy-6,14 - endo- (etheno or ethano) codide or morphide derivative (IX) by treatment with a formylating agent followed by hydrolysis. Alternatively, a 7-enol ether derivative (VII) may similarly be converted to the corresponding 7 - (2 - formyl-1-alkoxyvinyl) derivative (IX) by formylation and hydrolysis. By this route, the 7-enol ether derivatives (VII) are considered to be intermediates which may be isolated and purified or which may be prepared in situ and formylated without isolation or purification depending upon the circumstances.

The formylating reagent is prepared by treating a substituted formamide such as N,N - dimethylformamide, N,N-diethylformamide, N-formylpiperidine, N-formylmorpholine, N-methylforanilide, and the like, with phosgene, phosphoryl chloride or thionyl chloride in an inert solvent such as methylene chloride, ethylene chloride or chloroform. Alternatively, an excess of the substituted formamide may be used as the solvent. The formylation reaction (VI→IX or VII→IX) is also most conveniently carried out in an inert solvent such as methylene chloride, ethylene chloride, chloroform, or an excess of the substituted formamide employed to prepare the formylating reagent. The temperature range for the formylation reaction is from about 0° C. to about 35° C. although room temperature is preferred. The hydrolysis step may be carried out with dilute acid or dilute alkali but preferably with aqueous sodium acetate. When the formylation reaction is substantially complete (usually from several minutes to several hours or more), the reaction mixture is stirred with aqueous sodium acetate for from several minutes to several hours at room temperature and the product is isolated. The above described formylation reaction may be considered to be effected via a formylating reagent such as that shown by compound (XI), the formylating reagent formed from N,N-dimethylformamide and phosgene. This formylating reagent then reacts with

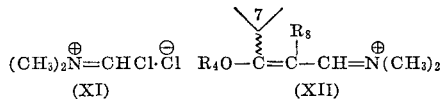

(XI)          (XII)

the ketal (VI) or enol-ether (VII) to form an iminium intermediate (XII) (partial structure only shown) which is converted by hydrolysis to the 7-(2-formyl-1-alkoxyvinyl) derivative (IX).

Subsequently, a 7-(2-formyl-1-alkoxyvinyl) derivative (IX) may be transformed to the corresponding 7-(5-pyrazolyl)-7,8 - dihydro - 6-methoxy-6,14-endo- (etheno or ethano) codide or morphide derivative (X) by treatment with a hydrazine of the formula $R_9NHNH_2$. This reaction is conveniently carried out in a solvent such as acetic acid. The temperature range employed is from about 50° C. to about 125° C. with the preferred range being from 80° C. to 125° C. The reaction is conveniently carried out by heating on the steam bath or at the refluxing temperature of the solvent, and is substantially complete within about one hour to several hours or more. All the products in the above reaction scheme are isolated and purified by standard procedures well known to those skilled in the art.

The 7 - (5 - pyrazolyl) - 7,8 - dihydro - 6 - methoxy-6,14 - endo - (etheno or ethano) codides and morphides (X) are active analgesics when measured by the "writhing syndrome" test, supra, for analgesic activity. In a representative operation, and merely by way of illustration, the following compounds are active analgesics when tested in this procedure at the indicated oral dose as set forth in Table I below:

TABLE I

| Compound | Oral dose, mg./kg. of body weight |
|---|---|
| 7α-(5α-pyrazolyl)-6,7,8,14-tetrahydro-6,14-endoethenothebaine | 100 |
| 7α-(1-phenyl-5-pyrazolyl)-6,7,8,14-tetrahydro-6,14-endoethenothebaine | 200 |
| 7α-[1-(p-fluorophenyl)-5-pyrazolyl]-6,7,8,14-tetrahydro-6,14-endoethenothebaine | 200 |
| N-cyclopropylmethyl-7α-(5-pyrazolyl)-6,7,8,14-tetrahydro-6,14-endoethenonorthebaine hydrochloride | 25 |
| N-cyclopropylmethyl-7α-(1-phenyl-5-pyrazolyl)-6,7,8,14-tetrahydro-6,14-endoethenonororipavine citrate | [1] 0.01 |
| N-cyclopropylmethyl-7α-[1-(m-chlorophenyl)-5-pyrazolyl]-6,7,8,14-tetrahydro-6,14-endoethenonororipavine hydrochloride | [1] 0.004 |

[1] $ED_{50}$.

When tested by the rat tail-flick procedure, supra, using a high intensity heat stimulus calibrated to produce an average 4–6 second response time in untreated animals (controls), certain 7-(5-pyrazolyl) derivatives (X) show this type of analgesic activity as indicated by the appropriate median effective doses as set forth in Table II below:

TABLE II

| Compound | $ED_{50}$ mg./kg. of body weight |
|---|---|
| 7α-(1-phenyl-5-pyrazolyl)-6,7,8,14-tetrahydro-6,14-endoethenothebaine | ca. 3 |
| 7α-[1-(p-flourophenyl)-5-pyrazolyl]-6,7,8,14-tetrahydro-6,14-endoethenothebaine | ca. 5 |
| N-cyclopropylmethyl-7α-(1-phenyl-5-pyrazolyl)-6,7,8,14-tetrahydro-6,14-endoethenonororipavine citrate | 0.14 |
| N-cyclopropylmethyl-7α-[1-(m-chlorophenyl)-5-pyrazolyl]-6,7,8,14-tetrahydro-6,14-endoethenonororipavine hydrochloride | 0.32 |
| N-cyclopropylmethyl-7α-[1-(m-fluorophenyl)-5-pyrazolyl]-6,7,8,14-tetrahydro-6,14-endoethenonororipavine hydrochloride | ca. 0.5 |
| N-cyclopropylmethyl-7α-[1-(m-bromophenyl)-5-pyrazolyl]-6,7,8,14-tetrahydro-6,14-endoethenonororipavine hydrochloride | <3 |
| N-cyclopropylmethyl-7α-[1-(m-tolyl)-5-pryazolyl]-6,7,8,14-tetrahydro-6,14-endoethenonororipavine hydrochloride | ca. 0.3 |

When tested by a procedure similar to that described by Harris and Pierson (above), N - cyclopropylmethyl-7α - (5 - pyrazolyl) - 6,7,8,14 - tetrahydro - 6,14 - endoethenonorthebaine and N - cyclopropylmethyl - 7α - (1-phenyl - 5 - pyrazolyl) - 6,7,8,14 - tetrahydro - 6,14-endoethenonororipavine show analgesic antagonist actions when tested against morphine.

The novel compounds of this invention may exist in several isomeric forms such as stereoisomers. It is to be understood that the present invention includes within its scope all such isomeric forms. For example, the codides used as starting materials have several asymmetric carbon atoms, and epimers at the C–7 asymmetric center are possible and are known. Formation of stereoisomers, or epimers, at C–7 is therefore possible in the products of this invention. The nuclear magnetic resonance spectra of these 7α- and 7β - [di(lower alkoxy)methyl] - 7,8-dihydro - 6 - methoxy - 6,14 - endo- (etheno or ethano) codides and morphides and 7α- and 7β - lower alkylenedioxymethyl) - 7,8 - dihydro - 6 - methoxy - 6,14 - endo-(etheno or ethano) codides and morphides are particularly helpful in characterizing the mixtures of epimers or the substantially pure stereoisomers as obtained from the reaction mixtures or from subsequent purifications and separations. These isomers may then be separated by methods (such as fractional crystallization and partition-chromatography) well known to those skilled in the art. All such stereoisomeric forms of the 7 - [di(lower alkoxy) methyl] - 7,8 - dihydro - 6 - methoxy - 6,14 - endo-(etheno or ethano) codides and morphides and 7-(lower alkylenedioxymethyl) - 7,8 - dihydro - 6 - methoxy-6,14-endo- (etheno or ethano) codides and morphides are, therefore, included within the purview of this invention.

In accordance with accepted convention, an α-substituent at the 7-position is behind the plane of the paper whereas a β-substituent at the 7-position is in front of the plane of the paper. This is usually represented by a - - - - bond for an α-substituent, a ——— bond for a β-substituent, and a ~ bond where both are indicated.

The invention will be described in greater detail in conjunction with the following specific examples.

EXAMPLE 1

Preparation of 7α-(1,1-dimethoxyethyl)-6,7,8,14-tetrahydro-6,14-endoethenothebaine Perchloric acid (20 ml.; 72%) is added dropwise to a stirred solution of 7α-acetyl - 6,7,8,14 - tetrahydro-6,14-endoethenothebaine (40 g.) in methanol (400 ml.). Trimethyl orthoformate (200 ml.) is then added, and the mixture is stirred for 5 minutes. Pyridine (40 ml.) is then added, and the mixture is poured into aqueous sodium bicarbonate. The material which separates is collected and dissolved in methylene chloride solution, and this fraction is dried. Evaporation of solvent followed by crystallization from methanol gives 7α - (1,1 - dimethoxyethyl) - 6,7,8,14 - tetrahydro - 6,14 - endoethenothebaine (36.57 g.), M.P. 121–123° C. with effervescence. Second and third crops yield 2.1 g., M.P. 17–118° C. with effervescence and 0.6 g., M.P. 115–117° C. with effervescence.

EXAMPLE 2

Preparation of 7α-(1,1-ethylenedioxyethyl)-6,7,8,14-tetrahydro-6,14-endoethenothebaine A mixture of 7α - acetyl - 6,7,8,14 - tetrahydro - 6,14-endoethenothebaine (1 g.), ethylene glycol (6 ml.), benzene (75 ml.), and p-toluenesulfonic acid dihydrate (550 mg.) is stirred and heated under reflux for eighteen hours; water formed during the reaction being removed with a Dean-Stark moisture trap. An excess of aqueous sodium bicarbonate is added to the cooled mixture and the layers are separated. The aqueous phase is extracted with methylene chloride and the combined organic extracts are dried. The gum obtained by evaporation of solvent is dissolved in methylene chloride and the solution is passed through a short column of Magnesol®. The eluate is evaporated and the residue is crystallized from n-hexane to give 7α - (1,1 - ethylenedioxyethyl) - 6,7,8,14 - tetrahydro - 6,14 - endoethenothebaine (680 mg.), M.P. 122–125° C.

EXAMPLE 3

Preparation of 7α-(1,1-dimethoxyethyl)-6,7,8,14-tetrahydro-6,14-endoethenooripavine 7α - (1,1 - dimethoxyethyl) - 6,7,8,14-tetrahydro-6,14-endoethenothebaine (5 g.) is added to a solution of potassium hydroxide (20 g.) in diethylene glycol (100 ml.) heated to ca. 210° C. The reaction mixture is stirred at ca. 210° C. for 25 minutes, and is then cooled and diluted with water. The aqueous solution is washed with ether, adjusted to pH 8 with ammonium chloride, and then extracted with methylene chloride. The methylene chloride extracts are combined, washed with water and dried. The oil obtained by evaporation of the solvent is crystallized from methanol (charcoal) to give 7α-(1,1-dimethoxyethyl) - 6,7,8,14 - tetrahydro - 6,14-endoethenooripavine (2.47 g.), M.P. 116–117° C. with effervescence.

This material is solvated; when heated above its melting point, it resolidifies at about 135° C. and remelts at 178–180° C. A second crop (250 mg.) is also collected; M.P. 113–114° C. with effervescence, resolidified ca. 145° C., and remelts 174–176° C.

EXAMPLE 4

Preparation of N-cyano-7α-(1,1-dimethoxyethyl)-6,7,8,14-tetrahydro-6,14-endoethenonorthebaine A solution of cyanogen bromide (17.9 g.) in chloroform (175 ml.) is dried over sodium sulfate for a few minutes and is then filtered onto 7α-(1,1-dimethoxyethyl)-6,7,8,14 - tetrahydro - 6,14 - endoethenothebaine (35 g.), chloroform (175 ml.) being used for washing. The mixture is heated under reflux for 26 hours. The cooled mixture is washed with an aqueous sodium bicarbonate solution, washed with water, and dried. The residue obtained by evaporation of the solvent is crystallized from methylene chloride-methanol to give N-cyano-7α-(1,1-dimethoxyethyl) - 6,7,8,14 - tetrahydro - 6,14 - endoethenonorthebaine (20 g.), M.P. 211–214° C. with effervescence.

EXAMPLE 5

Preparation of 7α-(1,1-dimethoxyethyl)-6,7,8,14-tetrahydro-6,14-endoethenonorthebaine N - cyano - 7α - (1,1 - dimethoxyethyl)-6,7,8,14-tetrahydro-6,14-endoethenonorthebaine (0.5 g.) is added to a solution of potassium hydroxide (2 g.) in ethylene glycol (10 ml.) heated to ca. 167° C. The reaction mixture is stirred at ca. 167° C. for 15 minutes, and is then cooled and diluted with water. The aqueous solution is extracted with diethyl ether, and the ether extracts are combined, washed with water and dried. The residue obtained by evaporation of the solvent is crystallized from diethyl ether to give 7α - (1,1 - dimethoxyethyl)-6,7,8,14-tetrhydro-6,14-endoethenonorthebaine (213 mg.), M.P. 139–145° C.

EXAMPLE 6

Preparation of N-allyl-7α-(1,1-dimethoxyethyl)-6,7,8,14-tetrahydro-6,14-endoethenonorthebaine A mixture of 7α - (1,1-dimethoxyethyl)-6,7,8,14-tetrahydro-6,14-endoethenonorthebaine (9 g.) with allyl bromide (9 ml.), anhydrous potassium carbonate (9 g.), and ethanol (90 ml.) is heated under reflux for 2 hours with stirring. After standing at room temperature overnight, the mixture is filtered and solvent evaporated. A solution of the residue in methylene chloride is passed through a short column of Magnesol® and the material obtained by evaporation of the eluate crystallized from n-hexane to give N-allyl - 7α - (1,1-dimethoxyethyl)-6,7,8,14-tetrahydro-6,14-endoethenonorthebaine, M.P. 95–98° C. A further amount, M.P. 90–92° C., is obtained from the mother liquor to give a total yield of 71%.

EXAMPLE 7

Preparation of 7α-(1,1-dimethoxyethyl)-6,7,8,14-tetrahydro-6,14-endoethenonororipavine One hundred ml. of diethylene glycol containing 20.0 g. potassium hydroxide is heated to 215° C. and 5.00 g. of 7α - (1,1 - dimethoxyethyl) - 6,7,8,14 - tetrahydro - 6,14-endoethenonorthebaine is added. The temperature is maintained between 215° C. and 220° C. for 30 minutes and then allowed to cool to room temperature over about one hour. The solution is diluted with 200 ml. of water, and 100 ml. of saturated aqueous ammonium chloride is added. The solution is extracted with six 50 ml. portions of methylene chloride which are combined, extracted one time with water, dried over anhydrous sodium sulfate and evaporated to give an oil which crystallizes upon trituration with methanol; 7α-(1,1-dimethoxyethyl)-6,7,8,14-tetrahydro-6,14-endoethenonororipavine, M.P. 260° C. decomp. is obtained.

EXAMPLE 8

Preparation of 3-acetyl-7α-(1,1-dimethoxyethyl)-6,7,8, 14-tetrahydro-6,14-endoethenooripavine By treatment of 7α-(1,1-dimethoxyethyl)-6,7,8,14-tetrahydro-6,14-endoethenooripavine with acetic anhydride in pyridine, 3-acetyl-7α-(1,1-dimethoxyethyl)-6,7,8, 14-tetrahydro-6,14-endoethenooripavine is thereby obtained.

EXAMPLE 9

Preparation of 7α-(1,1-dimethoxyethyl)-N-propyl-6,7, 8,14-tetrahydro-6,14-endoethenonorthebaine By reacting 7α - (1,1 - dimethoxyethyl)-6,7,8,14-tetrahydro-6,14-endoethenonorthebaine with propyl iodide in an inert solvent, 7α-1,1,-dimethoxyethyl)-N-propyl-6,7,8, 14-tetrahydro-6,14-endoethenonorthebaine is thereby obtained.

EXAMPLE 10

Preparation of 7α-(1,1-dimethoxyethyl)-N-phenethyl-6,7,8,14-tetrahydro-6,14-endoethenonorthebaine By reacting 7α-(1,1-dimethoxyethyl)-6,7,8,14-tetrahydro-6,14-endoethenonorthebaine with phenethyl bromide in an inert solvent, 7α-(1,1-dimethoxyethyl)-N-phenethyl-6,7,8,14-tetrahydro-6,14-endoethenonorthebaine is thereby obtained.

EXAMPLE 11

Preparation of 7α(1,1-dimethoxyethyl)-N-(3-methyl-2-buten - 1 - yl)-6,7,8,14-tetrahydro-6,14-endoethenonorthebaine 7α-(1,1-dimethoxyethyl) - 6,7,8,14 - tetrahydro - 6,14-endoethenonorthebaine (4.135 g.) is dissolved in ethanol (50 ml.) containing sodium carbonate (5 g.), 1-bromo-3-methyl-2-butene (dimethyallyl bromide) (5 ml.) is added, and the mixture refluxed one hour. After cooling and filtration the solution is evaporated to give a semicrystalline mass with a carbonyl band in the infrared spectrum at 5.75μ indicating the presence of ketone (from hydrolyzed ketal). This material is dissolved in methanol (50 ml.) and 70% perchloric acid (2.5 ml.) added followed by trimethylorthoformate (25 ml.). After stirring five minutes at room temperature, pyridine (5 ml.) is aded and the entire solution then poured into aqueous saturated sodium bicarbonate solution (150 ml.). An oil separates, and the remaining aqueous solution is extracted three times with 50 ml. portions of methylene chloride. The methylene chloride extracts contained no significant amount of material (weight and infrared spectrum) and is discarded. The oil is taken up in methylene chloride, dried over sodium sulfate and evaporated to give a darkyellow glass (no ketone band by infrared). This crude product, 7α-(1,1-dimethoxyethyl)-N-(3-methyl-2-buten-1-yl)-6,7,8,14-tetrahydro - 6,14 - endoethenonorthebaine, is then used for subsequent reactions without further purification.

EXAMPLE 12

Preparation of 7α-(1,1-dimethoxyethyl)-N-propargyl-6,7, 8,14-tetrahydro-6,14-endoethenonorthebaine By reacting 7α-(1,1-dimethoxyethyl)-6,7,8,14-tetrahydro-6,14-endoethenonorthebaine with propargyl tosylate in an inert solvent, 7α-(1,1-dimethoxyethyl)-N-propargyl-6,7,8,14-tetrahydro-6,14-endoethenonorthebaine is thereby obtained.

EXAMPLE 13

Preparation of 7α-(1,1-dimethoxymethyl)-6,7,8,14-tetrahydro-6,14-endoethenothebaine Following the general procedure of Example 1, 7α-formyl-6,7,8,14-tetrahydro - 6,14 - endoethenothebaine is treated with perchloric acid and trimethyl orthoformate in methanol at room temperature to give 7α-(1,1-dimethoxymethyl)-6,7,8,14-tetrahydro - 6,14 - endoethenothebaine.

EXAMPLE 14

Preparation of 7α-(α,α-dimethoxybenzyl)-6,7,8,14-tetrahydro-6,14-endoethenothebaine Following the general procedure of Example 1, 7α-benzoyl - 6,7,8,14 - tetrahydro - 6,14 - endoethenothebaine is treated with perchloric acid and trimethyl orthoformate in methanol at room temperature to give 7α-(α,α-dimethoxybenzyl) - 6,7,8,14 - tetrahydro - 6,14-endoethenothebaine.

EXAMPLE 15

Preparation of 7α-(1,1-dimethoxybutyl)-6,7,8,14-tetrahydro-6,14-endoethenothebaine Following the general procedure of Example 1, 7α-butyryl-6,7,8,14-tetrahydro - 6,14 - endoethenothebaine is treated with perchloric acid and trimethyl orthoformate in methanol at room temperature to give 7α-(1,1-dimethoxybutyl)-6,7,8,14-tetrahydro-6,14-endoethenothebaine.

EXAMPLE 16

Preparation of 7α-(1,1-dimethoxyethyl)-6,7,8,14-tetrahydro-6,14-endoethanothebaine Following the general procedure of Example 1, 7α-acetyl-6,7,8,14-tetrahydro - 6,14 - endoethanothebaine is treated with perchloric acid and trimethyl orthoformate in methanol at room temperature to give 7α-(1,1-dimethoxyethyl)-6,7,8,14-tetrahydro-6,14-endoethanothebaine.

EXAMPLE 17

Preparation of 7α-(1,1-di-n-propyloxyethyl)-6,7,8,14-tetrahydro-6,14-endoethenothebaine Following the general procedure of Example 1, 7a-acetyl-6,7,8,14-tetrahydro-6,14-endoethenothebaine is treated with perchloric acid and tri-n-propyl orthoformate in n-propanol at room temperature to give 7α-(1,1-di-n-propyloxyethyl)-6,7,8,14 - tetrahydro - 6,14 - endoethenothebaine.

EXAMPLE 18

Preparation of N-cyclopropylcarbonyl-7α-(1,1-dimethoxyethyl)-6,7,8,14-tetrahydro-6,14-endoethenonorthebaine Following the general procedure of Example 1, 7α-acetyl-N-cyclopropylcarbonyl - 6,7,8,14 - tetrahydro-6,14-endoethenonorthebaine is treated with perchloric acid and trimethyl orthoformate in methanol at room temperature to give N-cyclopropylcarbonyl-7α-(1,1,-dimethoxyethyl)-6,7,8,14-tetrahydro-6,14-endoethenonorthebaine.

EXAMPLE 19

Preparation of 7α-(1,1-dimethoxyethyl)-6,7,8,14-tetrahydro-6,14-endoethenonorthebaine Following the general procedure of Example 1, 7α-acetyl-6,7,8,14-tetrahydro - 6,14 - endoethenonorthebaine is treated with perchloric acid and trimethyl orthoformate in methanol at room temperature to give 7α-(1,1-dimethoxyethyl)-6,7,8,14-tetrahydro - 6,14 - endoethenonorthebaine.

EXAMPLE 20

Preparation of 7β-(1,1-dimethoxyethyl)-6,7,8,14-tetrahydro-6,14-endoethenothebaine Following the general procedure of Example 1, 7β-acetyl - 6,7,8,14 - tetrahydro-6,14-endoethenothebaine is treated with perchloric acid and trimethyl orthoformate in methanol at room temperature to give 7β-(1,1-dimethoxyethyl)-6,7,8,14-tetrahydro-6,14-endoethenothebaine.

EXAMPLE 21

Preparation of 7α-(1,1-ethylenedioxybutyl)-6,7,8,14-tetrahydro-6,14-endoethenooripavine Following the procedure of Example 2, 7α-butyryl-6,7,8,14-tetrahydro-6,14-endoethenothebaine is treated with ethylene glycol and p-toluenesulfonic acid in benzene to give 7α-(1,1-ethylenedioxybutyl)-6,7,8,14-tetrahydro-6,14-endoethenothebaine. Following the procedure of Example 3, 7α-(1,1-ethylenedioxybutyl)-6,7,8,14-tetrahydro-6,14-endoethenothebaine is heated to 200–220° C. in a mixture of diethylene glycol and potassium hydroxide to give 7α-(1,1-ethylenedioxybutyl)-6,7,8-14-tetrahydro-6,14-endoethenooripavine.

EXAMPLE 22

Preparation of 7α-(1,1-ethylenedioxyethyl)-6,7,8,14-tetrahydro-6,14-endoethenooripavine Following the general procedure of Example 3, 7α-(1,1-ethylenedioxyethyl) - 6,7,8,14-tetrahydro-6,14-endoethenothebaine is treated with potassium hydroxide in diethylene glycol at ca. 210–220° C. Isolation of the product gives 7α-(1,1-ethylenedioxyethyl)-6,7,8,14-tetrahydro-6,14-endoethenooripavine.

EXAMPLE 23

Preparation of 7α-(1,1-dimethoxymethyl)-6,7,8,14-tetrahydro-6,14-endoethenooripavine Following the general procedure of Example 3, 7α-(1,1-dimethoxymethyl)-6,7,8,14-tetrahydro - 6,14 - endoethenothebaine is treated with potassium hydroxide in diethylene glycol at ca. 210°–220° C. to give 7α-(1,1-dimethoxymethyl) - 6,7,8,14 - tetrahydro - 6,14-endoethenooripavine.

EXAMPLE 24

Preparation of 7α-(α,α-dimethoxybenzyl)-6,7,8,14-tetrahydro-6,14-endoethenooripavine Following the general procedure of Example 3, 7α-(α,α-dimethoxybenzyl)-6,7,8,14-tetrahydro - 6,14 - endoethenothebaine is treated with potassium hydroxide in diethylene glycol at ca. 210°–220° C. to give 7α-(α,α-dimethoxybenzyl) - 6,7,8,14 - tetrahydro - 6,14 - endoethenooripavine.

EXAMPLE 25

Preparation of 7α-(1,1-dimethoxybutyl)-6,7,8,14-tetrahydro-6,14-endoethenooripavine Following the general procedure of Example 3, 7α-(1,1-dimethoxybutyl) - 6,7,8,14 - tetrahydro - 6,14-endoethenothebaine is treated with potassium hydroxide in diethylene glycol at ca. 210°–220° C. to give 7α-(1,1-dimethoxybutyl) - 6,7,8,14 - tetrahydro - 6,14 - endoethenooripavine.

EXAMPLE 26

Preparation of 7α-(1,1-dimethoxyethyl)-6,7,8,14-tetrahydro-6,14-endoethanooripavine Following the general procedure of Example 3, 7α-(1,1-dimethoxyethyl) - 6,7,8,14 - tetrahydro - 6,14-endoethanothebaine is treated with potassium hydroxide in diethylene glycol at ca. 210°–220° C. to give 7α-(1,1-dimethoxyethyl) - 6,7,8,14 - tetrahydro - 6,14 - endoethenooripavine.

EXAMPLE 27

Preparation of 7β-(1,1-dimethoxyethyl)-6,7,8,14-tetrahydro-6,14-endoethenooripavine Following the general procedure of Example 3, 7β-(1,1-dimethoxyethyl) - 6,7,8,14 - tetrahydro - 6,14-endoethanothebaine is treated with potassium hydroxide in diethylene glycol at ca. 210°–220° C. to give 7β-(1,1-dimethoxyethyl) - 6,7,8,14 - tetrahydro - 6,14 - endoethenooripavivne.

EXAMPLE 28

Preparation of N-cyano-7α-(1,1-dimethoxybutyl)-6,7,8,14-tetrahydro-6,14-endoethenonorthebaine Following the general procedure of Example 4, 7α-(1,1-dimethoxybutyl) - 6,7,8,14 - tetrahydro - 6,14 - endoethenothebaine is treated with cyanogen bromide in an inert solvent. Isolation of the product gives N-cyano-7α-(1,1-dimethoxybutyl) - 6,7,8,14 - tetrahydro - 6,14-endoethenonorthebaine.

EXAMPLE 29

Preparation of 7α-(1,1-dimethoxybutyl)-6,7,8,14-tetrahydro-6,14-endoethenonorthebaine Following the general procedure of Example 5, N-cyano-7α-(1,1-dimethoxybutyl) - 6,7,8,14 - tetrahydro-6,14-endoethenonorthebaine is treated with potassium hydroxide in ethylene glycol at ca. 160°–170° C. Isolation of the product gives 7α-(1,1-dimethoxybutyl)-6,7,8,14-tetrahydro-6,14-endoethenonorthebaine.

EXAMPLE 30

Preparation of N-cyclopropylcarbonyl-7α-(1,1-dimethoxybutyl)-6,7,8,14-tetrahydro-6,14-endoethenonorthebaine Following the general procedure of Example 32, 7α-(1,1-dimethoxybutyl) - 6,7,8,14 - tetrahydro - 6,14 - endoethenonorthebaine is treated with cyclopropylcarbonyl chloride in pyridine at room temperature. Isolation of the product gives N-cyclopropylcarbonyl-7α-(1,1-dimethoxybutyl)-6,7,8,14-tetrahydro - 6,14 - endoethenonorthebaine.

EXAMPLE 31

Preparation of N-cyclopropylmethyl-7α-(1,1-dimethoxybutyl)-6,7,8,14-tetrahydro-6,14-endoethenonorthebaine Following the general procedure of Example 33, N-cyclopropylcarbonyl - 7α - (1,1-dimethoxybutyl)-6,7,8,14-tetrahydro-6,14-endoethenonorthebaine is treated with lithium aluminum hydride in anhydrous tetrahydrofuran. Isolation of the product gives N-cyclopropylmethyl-7α-(1,1-dimethoxybutyl) - 6,7,8,14 - tetrahydro - 6,14 - endoethenonorthebaine.

EXAMPLE 32

Preparation of N-cyclopropylcarbonyl-7α-(1,1-dimethoxyethyl)-6,7,8,14-tetrahydro-6,14-endoethenonorthebaine 7α-(1,1-dimethoxyethyl) - 6,7,8,14 - tetrahydro - 6,14-endoethenonorthebaine (50 mg.) in pyridine (2 ml.) is added dropwise to a stirred mixture of cyclopropylcarbonyl chloride (50 mg.) and pyridine (2 ml.) at 0° C., and the resulting mixture is stirred at 0° C. for ca. 2 hours. This is then added dropwise to an aqueous sodium bicarbonate solution with stirring. The precipitate is collected and dried in methylene chloride. The residue obtained upon evaporation of solvent is collected with diethyl ether to give N-cyclopropylcarbonyl-7α-(1,1-dimethoxyethyl)-6,7,8,14-tetrahydro - 6,14 - endoethenonorthebaine (30 mg.), M.P. 164–169° C. with effervescence.

EXAMPLE 33

Preparation of N-cyclopropylmethyl-7α-(1,1-dimethoxyethyl)-6,7,8,14-tetrahydro-6,14-endoethenonorthebaine Finely powdered N-cyclopropylcarbonyl - 7α - (1,1-dimethoxyethyl) - 6,7,8,14 - tetrahydro - 6,14-endoethenonorthebaine (51.5 g.) is added to a stirred suspension of lithium aluminum hydride (26 g.) in diethyl ether (2 liters) and the mixture is heated under reflux for 2 hours. Water is added dropwise cautiously until the excess of lithium aluminum hydride decomposes and then the ether is decanted and dried. The residue obtained by evaporation of solvent is crystallized from methanol-n-hexane to give N-cyclopropylmethyl - 7α - (1,1-dimethoxyethyl)-6,7,8,14-tetrahydro - 6,14 - endoethenonorthebaine (41.86 g., 83.5%), M.P. 130–132° C.

EXAMPLE 34

Preparation of N-cyclopropylmethyl-7α-(1,1-dimethoxyethyl)-6,7,8,14-tetrahydro-6,14-endoethenonororipavine Following the general procedure of Example 3, N-cyclopropylmethyl-7α-(1,1-dimethoxyethyl)-6,7,8,14 - tetrahydro 6,14-endoethenonorthebaine (2 g., 4.3 mmole) is added to a stirred solution of potassium hydroxide (8 g.) in diethylene glycol (40 ml.) at ca. 220° C. After 30 minutes at this temperature the mixture is cooled and diluted with water. The solution is adjusted to pH 8 with saturated aqueous ammonium chloride added dropwise with vigorous stirring. The precipitate which forms is filtered off and dried via methylene chloride solution. The oil obtained by evaporation of the solvent is treated with charcoal in diethyl ether solution. Evaporation of solvent gives an oil which crystallizes from methanol to give N-cyclopropylmethyl-7α-(1,1 - dimethoxyethyl) - 6,7,8,14-tetrahydro - 6,14 - endoethenonororipavine methanolate, M.P. 97–99° C. with effervescence.

EXAMPLE 35

Preparation of N-(3-methyl - 2 - buten-1-yl)-7α-(1,1-dimethoxyethyl) - 6,7,8,14 - tetrahydro - 6,14 - endoethenonororipavine 1-bromo-3-methyl-2-butene (dimethallyl bromide; 1.00 g.) is added to a stirred suspension of the norketal 7α-(1,1-dimethoxyethyl)-6,7,8,14-tertahydro - 6,14 - endoethenonororipavine (2.400 g.) in 30 ml. of methylene chloride and stirring is continued at room temperature for 40 hours during which time all the material dissolves. The organic solution is shaken with excess aqueous sodium bicarbonate solution, dried over sodium sulfate and evaporated. Trituration of the resulting brown oil with methanol results in the crystallization of N-(3-methyl-2-buten-1-yl)-7α-(1,1-dimethoxyethyl)-6,7,8,14-tetrahydro - 6,14-endoethenonororipavine (0.0963 g., 47%) in two crops both having M.P. 170–172° C.

EXAMPLE 36

Preparation of N-(3-methyl-2-buten-1-yl)-7α-(1,1-dimethoxyethyl)-6,7,8,14-tetrahydro - 6,14 - endoethenonororipavine The crude ketal, 7α-(1,1-dimethoxyethyl)-N-(3-methyl-2-buten-1-yl)-6,7,8,14-tetrahydro-6,14 - endoethenonorthebaine, as a yellow glass (see Example 11) is added to diethylene glycol (100 ml.) containing potassium hydroxide (20 g.) at 210° C., and the mixture stirred for 30 minutes. After cooling, the addition of water (200 ml.) results in the precipitation of semicrystalline starting material. The diluted diethylene glycol filtrate is then diluted further with aqueous saturated ammonium chloride solution (100 ml.) and another precipitate isolated (750 mg.) which is phenolic (base solubility and infrared). The recovered starting material (the first precipitate) is rehydrolyzed as before with the exception that a temperature of 215–220° C. is maintained. Similar workup gives crude product identical with that previously isolated. When purified, N-(3-methyl-2-buten-1-yl)-7α-(1,1 - dimethoxyethyl)-6,7,8,14-tetrahydro-6,14 - endoethenonororipavine has M.P. 170–172° C. and $\lambda_{max}^{KBr}$: 2.90, 6.15 (doublet), 6.65 and 6.88μ

EXAMPLE 37

Preparation of N-cyclobutylcarbonyl-7α-(1,1-dimethoxyethyl)-6,7,8,14-tetrahydro-6,14-endoethenonorthebaine Cyclobutylcarbonyl chloride (10 g.) is added to methylene chloride (200 ml.) containing anhydrous potassium carbonate (10 g.) and stirred at room temperature for 15 minutes. The ketal 7α(-1,1-dimethoxyethyl)-6,7,8,14-tetrahydro-6,14-endoethenonorthebaine (20 g.) in methylene chloride (200 ml.) is added in a rapid stream, and the mixture stirred for one hour. After washing with excess aqueous sodium bicarbonate solution and then with water the organic solution is dried over sodium sulfate and evaporated to give an oil (a band in the infrared at about 6.7μ indicates the presence of ketone from hydrolized ketal). The oil is then dissolved in methanol (200 ml.), 72% perchloric acid (10 ml.) is added followed by trimethylorthoformate (100 ml.). After stirring at room temperature for five minutes, pyridine (20 ml.) is added and the entire mixture poured into aqueous sodium bicarbonate solution (300 ml.). The mixture is extracted six times with 50 ml. portions of methylene chloride; the organic phases are combined, extracted with water, dried over sodium sulfate and evaporated. Crystalline N-cyclobutylcarbonyl-7α-(1,1-dimethoxyethyl)-6,7,8,14 - tetrahydro-6,14-endoethenonorthebaine is obtained in 5 successive crops by crystallization from methanol/hexane (total yield 17.15 g.; 71.5%), M.P. 184–185° C.

EXAMPLE 38

Preparation of N - cyclobutylmethyl-7α-(1,1-dimethoxyethyl)-6,7,8,14-tetrahydro-6,14-endoethenonorthebaine N-cyclobutylcarbonyl-7α-(1,1-dimethoxyethyl) - 6,7,8,14-tetrahydro-6,14-endoethenonorthebaine (16.4 g.) is mixed with 200 ml. of diethyl ether and added to a stirred suspension of lithium aluminum hydride (7 g.) in 400 ml. of diethyl ether, and the mixture is heated under reflux for 2.5 hours. Water is cautiously added dropwise until the excess lithium aluminum hydrided is decomposed. The ether layer is decanted, dried, and evaporated to a non-crystalline residue. N-cyclobutylmethyl-7α-(1,1-dimethoxyethyl)-6,7,8,14-tetrahydro-6,14-endoethenonorthebaine is thereby obtained as a glass; infrared, no carbonyl band; nuclear magnetic resonance δ3.22 ($C_{19}$-dimethoxy) and 2.50 (N—$CH_2$—$C_4H_7$).

EXAMPLE 39

Preparation of N - cyclobutylmethyl-7α-(1,1-dimethoxyethyl)-6,7,8,14-tetrahydro-6,14-endoethenonororipavine Following the general procedure of Example 3, N-cyclobutylmethyl - 7α - (1,1 - dimethoxyethyl) - 6,7,8,14-tetrahydro-6,14-endoethenonorthebaine is treated with potassium hydroxide in diethyleneglycol at ca. 210°–220° C. to give N-cyclobutylmethyl-7α(1,1-dimethoxyethyl)-6,7,8,14-tetrahydro-6,14-endoethenonororipavine.

EXAMPLE 40

Preparation of N-allyl-7α-(1,1-dimethoxyethyl)-6,7,8,14-tetrahydro-6,14-endoethenonororipavine By reacting 7α-(1,1-dimethoxyethyl)-6,7,8,14-tetrahydro-6,14-endoethenonororipavine with allyl bromide in an inert solvent, N-allyl-7α-(1,1-dimethoxyethyl)-6,7,8,14-tetrahydro-6,14 - endoethenonororipavine is thereby obtained.

EXAMPLE 41

Preparation of 7α-(1,1-dimethoxyethyl)-6,7,8,14-tetrahydro-6,14-endoethenonororipavine Following the general procedure of Example 3, N-cyano-7α-(1,1-dimethoxyethyl)-6,7,8,14-tetrahydro - 6,14-endoethenonorthebaine is treated with potassium hydroxide in diethylene glycol at ca. 210°–220° C. to give 7α-(1,1-dimethoxyethyl)-6,7,8,14-tetrahydro-6,14 - endoethenonororipavine.

EXAMPLE 42

Preparation of N-cyclopropylcarbonyl-7α-(1,1-dimethoxyethyl)6,7,8,14-tetrahydro-6,14-endoethanonorthebaine 7α-(1,1-dimethoxyethyl)-6,7,8,14 - tetrahydro - 6,14-endoethanonorthebaine in pyridine is added dropwise to a stirred mixture of cyclopropylcarbonyl chloride and pyridine at 0° C., and the resulting mixture is stirred at 0° C. for ca. 2 hours. This is then added dropwise to an aqueous sodium bicarbonate solution with stirring. The precipitate is collected and dried in methylene chloride.

The residue obtained upon evaporation of solvent is collected with diethyl ether to give N-cyclopropylcarbonyl-7α-(1,1-dimethoxyethyl)-6,7,8,14 - tetrahydro - 6,14-endoethanonorthebaine.

EXAMPLE 43

Preparation of N-cyclopropylmethyl-7α-(1,1-dimethoxyethyl)-6,7,8,14-tetrahydro-6,14-endoethanonorthebaine Lithium aluminum hydride is added to a solution of N-cyclopropylcarbonyl-7α-(1,1 - dimethoxyethyl) - 6,7,8, 14-tetrahydro-6,14-endoethanonorthebaine in anhydrous tetrahydrofuran, and the mixture is heated under reflux for ca. 1 hour. A saturated aqueous solution of potassium sodium tartrate is added. The mixture is filtered, and the residue is washed several times with diethyl ether. The combined washings and filtrate are washed with water and dried. Evaporation of the solvent gives N-cyclopropylmethyl-7α-(1,1 - dimethoxyethyl) - 6,7,8,14 - tetrahydro-6,14-endoethanonorthebaine.

EXAMPLE 44

Preparation of N-cyclopropylmethyl-7α-(1,1-dimethoxyethyl)-6,7,8,14-tetrahydro-6,14-endoethanonororipavine Following the general procedure of Example 3, N-cyclopropylmethyl-7α-(1,1-dimethoxyethyl) - 6,7,8,14 - tetrahydro-6,14-endoethanonorthebaine is treated with potassium hydroxide in diethyleneglycol at ca. 210°–220° C. to give N-cyclopropylmethyl-7α-(1,1-dimethoxyethyl)-6,7, 8,14-tetrahydro-6,14-endoethanonororipavine.

EXAMPLE 45

Preparation of 7α - (1,1 - dimethoxyethyl)-N-(3-methyl-2-buten - 1 - yl)-6,7,8,14-tetrahydro-6,14-endoethanonorthebaine By reacting 7α-(1,1-dimethoxyethyl)-6,7,8,14-tetrahydro-6,14-endoethanonorthebaine with 3-methyl-2-buten-1-yl bromide in an inert solvent, 7α-(1,1-dimethoxyethyl)-N - (3 - methyl - 2 - buten-1-yl)-6,7,8,14-tetrahydro-6,14-endoethanonorthebaine is thereby obtained.

EXAMPLE 46

Preparation of 7α-(1,1-dimethoxyethyl)-N-(3-methyl-2-buten - 1 - yl) - 6,7,8,14 - tetrahydro-6,14-endoethanonororipavine Following the general procedure of Example 3, 7α-(1,1 - dimethoxyethyl)-N-(3-methyl-2-buten-1-yl)-6,7,8, 14-tetrahydro-6,14-endoethanonorthebaine is treated with potassium hydroxide in diethyleneglycol at ca. 210°–220° C. to give 7α-(1,1-dimethoxyethyl)-N-(3-methyl-2-buten-1-yl)-6,7,8,14-tetrahydro-6,14-endoethanonororipavine.

EXAMPLE 47

Preparation of 7α-(1,1-dimethoxyethyl)-6,7,8,14-tetrahydro-6,14-endoethanonorthebaine N-cyano-7α-(1,1-dimethoxyethyl)-6,7,8,14 - tetrahydro-6,14-endoethanonorthebaine is added to a solution of potassium hydroxide in ethylene glycol heated to ca. 165° C. The reaction mixture is stirred at ca. 165° C. for 15 minutes, and is then cooled and diluted with water. The aqueous solution is extracted with diethyl ether, and the ether extracts are combined, washed with water and dried. The residue obtained by evaporation of the solvent is crystallized to give 7α-(1,1-dimethoxyethyl)-6,7,8,14-tetrahydro-6,14-endoethanonorthebaine.

EXAMPLE 48

Preparation of N-cyano-7α-(1,1-dimethoxyethyl)-6,7,8,14-tetrahydro-6,14-endoethanonorthebaine A solution of cyanogen bromide in chloroform is dried over sodium sulfate for a few minutes, and is then filtered onto 7α - (1,1-dimethoxyethyl)-6,7,8,14-tetrahydro-6,14-endoethanothebaine, chloroform being used for washing. The mixture is heated under reflux for about 24 hours. The cooled mixture is washed with an aqueous sodium bicarbonate solution, washed with water, and dried. The residue obtained by evaporation of the solvent is crystallized to give N-cyano-7α-(1,1-dimethoxyethyl)-6,7,8,14-tetrahydro-6,14-endoethanonorthebaine.

EXAMPLE 49

Preparation of 7α-(1,1-dimethoxybutyl)-6,7,8,14-tetrahydro-6,14-endoethanothebaine 7α - butyryl - 6,7,8,14-tetrahydro-6-14-endoethanothebaine in ethanol is shaken with a palladium on charcoal catalyst under hydrogen, and 7α-butyryl-6,7,8,14-tetrahydro-6,14-endoethanothebaine is thereby obtained. Following the general procedure of Example 1, 7α-butyryl-6,7,8,14-tetrahydro-6,14 - endoethanothebaine is treated with perchloric acid and trimethyl orthoformate in methanol at room temperature to give 7α-(1,1-dimethoxybutyl)-6,7,8,14-tetrahydro-6,14-endoethanothebaine.

EXAMPLE 50

Preparation of 7α-(1,1-dimethoxymethyl)-6,7,8,14-tetrahydro-6,14-endoethanothebaine Following the general procedure of Example 1, 7α-formyl - 6,7,8,14 - tetrahydro-6,14-endoethanothebaine is treated with perchloric acid and trimethyl orthoformate in methanol at room temperature to give 7α-(1,1-dimethoxymethyl) - 6,7,8,14 - tetrahydro-6,14-endoethanothebaine.

EXAMPLE 51

Preparation of 7α-(α,α-dimethoxybenzyl)-6,7,8,14-tetrahydro-6,14-endoethanothebaine 7α - benzoyl - 6,7,8,14-tetrahydro-6,14-endoethanothebaine in ethanol is shaken with a palladium on charcoal catalyst under hydrogen, and 7α-benzoyl-6,7,8,14-tetrahydro-6,14-endoethanothebaine is thereby obtained. Following the general procedure of Example 1, 7α-benzoyl-6,7,8,14 - tetrahydro - 6,14-endoethanothebaine is treated with perchloric acid and trimethyl orthoformate in methanol at room temperature to give 7α-(α,α-dimethoxybenzyl)-6,7,8,14-tetrahydro-6,14-endoethanothebaine.

EXAMPLE 52

Preparation of 7α-(1,1-dimethoxy-4-methylpentyl)-6,7,8, 14-tetrahydro-6,14-endoethenothebaine Following the general procedure of Example 1, 7α-(4-methylpentanoyl) - 6,7,8,14 - tetrahydro-6,14-endoethenothebaine is treated with perchloric acid and trimethyl orthoformate in methanol at room temperature to give 7α-(1,1-dimethoxy-4-methylpentyl)-6,7,8,14 - tetrahydro-6,14-endoethenothebaine.

EXAMPLE 53

Preparation of N-cyano-7β-(1,1-dimethoxyethyl)-6,7,8,14-tetrahydro-6,14-endoethenonorthebaine A solution of cyanogen bromide in chloroform is filtered onto 7β-(1,1-dimethoxyethyl)-6,7,8,14-tetrahydro-6,14-endoethenothebaine, chloroform being used for washing. The mixture is heated under reflux for 26 hours. The cooled mixture is washed with an aqueous sodium bicarbonate solution, washed with water, and dried. The residue obtained by evaporation of the solvent is N-cyano-7β - (1,1 - dimethoxyethyl)-6,7,8,14-tetrahydro-6,14-endoethenonorthebaine.

EXAMPLE 54

Preparation of 7β-(1,1-dimethoxyethyl)-6,7,8,14-tetrahydro-6,14-endoethenonorthebaine N-cyano-7β-(1,1 - dimethoxyethyl) - 6,7,8,14 - tetrahydro-6,14-endoethenonorthebaine is added to a solution of potassium hydroxide in ethylene glycol heated to ca. 165° C. The reaction mixture is stirred at ca. 165° C. for 15 minutes, and is then cooled and diluted with water.

The aqueous solution is extracted with diethyl ether, and the ether extracts are combined, washed with water and dried. The residue obtained by evaporation of the solvent is 7β - (1,1 - dimethoxyethyl)-6,7,8,14-tetrahydro-6,14-endoethenonorthebaine.

EXAMPLE 55

Preparation of N-cyclopropylmethyl-7β-(1,1-dimethoxyethyl)-6,7,8,14-tetrahydro-6,14-endoethenonorthebaine 7β - (1,1 - dimethoxyethyl) - 6,7,8,14 - tetrahydro-6,14-endoethenonorthebaine in pyridine is added dropwise to a stirred mixture of cyclopropylcarbonyl chloride and pyridine at 0° C., and the resulting mixture is stirred at 0° C. This is then added dropwise to an aqueous sodium bicarbonate solution with stirring. The precipitate is collected and dried in methylene chloride. The residue obtained upon evaporation of solvent is collected to give N - cyclopropylcarbonyl - 7β - (1,1 - dimethoxyethyl)-6,7,8,14-tetrahydro-6,14-endoethenonorthebaine. Lithium aluminum hydride is added to a solution of N-cyclopropylcarbonyl - 7β - (1,1 - dimethoxyethyl)-6,7,8,14-tetrahydro-6,14-endoethenonorthebaine in anhydrous tetrahydrofuran, and the mixture is heated under reflux. A saturated aqueous solution of potassium sodium tartrate is added. The mixture is filtered, and the residue is washed several times with diethyl ether. The combined washings and filtrate are washed with water and dried. Evaporation of the solvent gives N-cyclopropylmethyl-7β-(1,1-dimethoxyethyl)-6,7,8,14-tetrahydro - 6,14 - endoethenonorthebaine.

EXAMPLE 56

Preparation of N-cyclopropylmethyl-7β-(1,1-dimethoxyethyl)-6,7,8,14-tetrahydro-6,14-endoethenonororipavine Following the general procedure of Example 3, N-cyclopropylmethyl-7β-(1,1-dimethoxyethyl) - 6,7,8,14 - tetrahydro-6,14-endoethenonorthebaine is treated with potassium hydroxide in diethyleneglycol at ca. 210°–220° C. to give N - cyclopropylmethyl - 7β - (1,1 - dimethoxyethyl)-6,7,8,14-tetrahydro-6,14-endoethenonororipavine.

EXAMPLE 57

Preparation of N-cyano-7α-(1,1-ethylenedioxyethyl)-6,7,8,14-tetrahydro-6,14-endoethenonorthebaine A solution of cyanogen bromide in chloroform is filtered onto 7α-(1,1-ethylenedioxyethyl)-6,7,8,14-tetrahydro-6,14-endoethenothebaine, chloroform being used for washing. The mixture is heated under reflux for 26 hours. The cooled mixture is washed with an aqueous sodium bicarbonate solution, washed with water, and dried. The residue obtained by evaporation of the solvent is N-cyano-7α-(1,1 - ethylenedioxyethyl) - 6,7,8,14 - tetrahydro-6,14-endoethenonorthebaine.

EXAMPLE 58

Preparation of 7α-(1,1-ethylenedioxyethyl)-6,7,8,14-tetrahydro-6,14-endoethenonorthebaine N-cyano - 7α - (1,1 - ethylenedioxyethyl)-6,7,8,14-tetrahydro-6,14-endoethenonorthebaine is added to a solution of potassium hydroxide in ethylene glycol heated to ca. 165° C. The reaction mixture is stirred at ca. 165° C. for 15 minutes, and is then cooled and diluted with water. The aqueous solution is extracted with diethyl ether, and the ether extracts are combined, washed with water and dried. The residue obtained by evaporation of the solvent is 7α-(1,1-ethylenedioxyethyl)-6,7,8,14-tetrahydro-6,14-endoethenonorthebaine.

EXAMPLE 59

Preparation of N-cyclopropylmethyl-7α-(1,1-ethylenedioxyethyl)-6,7,8,14-tetrahydro - 6,14 - endoethenonorthebaine 7α-(1,1-ethylenedioxyethyl) - 6,7,8,14 - tetrahydro-6,14-endoethenonorthebaine in pyridine is added dropwise to a stirred mixture of cyclopropylcarbonyl chloride and pyridine at 0° C., and the resulting mixture is stirred at 0° C. This is then added dropwise to an aqueous sodium bicarbonate solution with stirring. The precipitate is collected and dried in methylene chloride. The residue obtained upon evaporation of solvent is collected to give N - cyclopropylcarbonyl - 7α - (1,1 - ethylenedioxyethyl)-6,7,8,14-tetrahydro-6,14-endoethenonorthebaine. Lithium aluminum hydride is added to a solution of N-cyclopropylcarbonyl - 7α - (1,1-ethylenedioxyethyl)-6,7,8,14-tetrahydro-6,14-endoethenonorthebaine in anhydrous tetrahydrofuran, and the mixture is heated under reflux. A saturated aqueous solution of potassium sodium tartrate is added. The mixture is filtered, and the residue is washed several times with diethyl ether. The combined washings and filtrate are washed with water and dried. Evaporation of the solvent gives N-cyclopropylmethyl-7α-(1,1-ethylenedioxyethyl)-6,7,8,14-tetrahydro - 6,14 - endoethenonorthebaine.

EXAMPLE 60

Preparation of N-cyclopropylmethyl-7α-(1,1-ethylenedioxyethyl)-6,7,8,14-tetrahydro - 6,14 - endoethenonororipavine Following the general procedure of Example 3, N-cyclopropylmethyl - 7α - (1,1-ethylenedioxyethyl)-6,7,8,14-tetrahydro-6,14-endoethenonorthebaine is treated with potassium hydroxide in diethyleneglycol at ca. 210°–220° C. to give N-cyclopropylmethyl-7α-(1,1-ethylenedioxyethyl - 6,7,8,14 - tetrahydro-6,14-endoethenonororipavine.

EXAMPLE 61

Preparation of 7α-(1-methoxyvinyl)-6,7,8,14-tetrahydro-6,14-endoethenothebaine

7α - (1,1 - dimethoxyethyl) - 6,7,8,14 - tetrahydro-6,14-endoethenothebaine (250 mg.) is heated to 200° C. and kept at this temperature for 1 hour, the cooled melt is extracted with boiling n-hexane, and evaporation of the extract gives 7α-(1 - methoxyvinyl)-6,7,8,14-tetrahydro-6,14-endoethenothebaine as a glass (200 mg.; 87%).

EXAMPLE 62

Preparation of N - cyclopropylcarbonyl-7α-(1-methoxyvinyl) - 6,7,8,14 - tetrahydro - 6,14 - endoethenonorthebaine N - cyclopropylcarbonyl - 7α - (1,1 - dimethoxyethyl)-6,7,8,14-tetrahydro-6,14-endoethenonorthebaine (50 mg). is rapidly heated to about 210° C. The solid melts with effervescence, remains as a liquid for 10–15 minutes at 200–210° C., and then begins to solidify. Heating at 200–210° C. is continued for about 15 minutes longer, the solid is cooled and collected with the aid of ether to give N-cyclopropylcarbonyl - 7α - (1-methoxyvinyl)-6,7,8,14-tetrahydro-6,14-endoethenonorthebaine (27 mg.), M.P. 225–231° C.

EXAMPLE 63

Preparation of N-cyclopropylmethyl-7α-(1-methoxyvinyl)-6,7,8,14-tetrahydro-6,14-endoethenonorthebaine N-cyclopropylcarbonyl-7α-(1 - methoxyvinyl)-6,7,8,14-tetrahydro-6,14-endoethenonorthebaine (200 mg.) is added to a stirred suspension of lithium aluminum hydride (200 mg.) in anhydrous ether (10 ml.). The mixture is heated under reflux for 1½ hours and then decomposed with water. The ether solution is decanted, the residue is washed with ether, and the combined ether fractions are dried. Evaporation of solvent gives N-cyclopropylmethyl-7α-(1-methoxyvinyl) - 6,7,8,14 - tetrahydro - 6,14 - endoethenonorthebaine as an oil, showing n.m.r. signals at 3.93δ (=CH$_2$; singlet 2H), 3.47δ (C$_{19}$-OCH$_3$; singlet, 3H), 2.35δ (N—CH$_2$-cyclopropyl; doublet, J=6 cps.).

EXAMPLE 64

Preparation of 7α-(1-methoxyvinyl)6,7,8,14-tetrahydro-6,14-endoethenooripavine

Following the general procedure of Example 61, 7α-(1,1-dimethoxyethyl) - 6,7,8,14 - tetrahydro-6,14-endoethenooripavine is heated above its melting point. Isolation of the product gives 7α-(1-methoxyvinyl)-6,7,8,14-tetrahydro-6,14-endoethenooripavine.

EXAMPLE 65

Preparation of N-cyano-7α-(1-methoxyvinyl-6,7,8,14-tetrahydro-6,14-endoethenonorthebaine Following the general procedure of Example 61, N-cyano - 7α - (1,1-dimethoxyethyl) - 6,7,8,14 - tetrahydro-6,14-endoethenonorthebaine is heated above its melting point. Isolation of the product gives N-cyano - 7α - (1-methoxyvinyl) - 6,7,8,14 - tetrahydro-6,14-endoethenonorthebaine.

EXAMPLE 66

Preparation of 7α-(1-methoxyvinyl)-6,7,8,14-tetrahydro-6,14-endoethenonorthebaine Following the general procedure of Example 61, 7α-(1,1-dimethoxyethyl)-6,7,8,14-tetrahydro - 6,14 - endoethenonorthebaine is heated above its melting point. Isolation of the product gives 7α - (1 - methoxyvinyl)-6,7,8,14-tetrahydro-6,14-endoethenonorthebaine.

EXAMPLE 67

Preparation of N-allyl-7α-(1-methoxyvinyl)-6,7,8,14-tetrahydro-6,14-endoethenonorthebaine Following the general procedure of Example 61, N-allyl-7α-(1,1-dimethoxyethyl)-6,7,8,14-tetrahydro - 6,14 - endoethenonorthebaine is heated above its melting point. Isolation of the product gives N-allyl-7α-(1-methoxyvinyl)-6,7,8,14-tetrahydro-6,14-endoethenonorthebaine.

EXAMPLE 68

Preparation of 7α-(1-methoxyvinyl)-6,7,8,14-tetrahydro-6,14-endoethenonororipavine Following the general procedure of Example 61, 7α-(1,1 - dimethoxyethyl)-6,7,8,14-tetrahydro - 6,14 - endoethenonororipavine is heated above its melting point for ca. 1 hour. Isolation of the product gives 7α-(1-methoxyvinyl)-6,7,8,14-tetrahydro-6,14-endoethenonororipavine

EXAMPLE 69

Preparation of 7α-(1-methoxyvinyl )- N - (3-methyl-2-buten - 1 - yl)-6,7,8,14-tetrahydro - 6,14 - endoethenonorthebaine Following the general procedure of Example 61, 7α-(1-dimethoxyethyl)-N-(3-methyl-2-buten-1-yl) - 6,7,8,14-tetrahydro-6,14-endoethenonorthebaine is heated above its melting point. Isolation of the product gives 7α-(1-methoxyvinyl) - N - (3-methyl-2-buten-1-yl) - 6,7,8,14-tetrahydro-6,14-endoethenonorthebaine.

EXAMPLE 70

Preparation of N-cyclopropylmethyl-7α-(1-methoxyvinyl)-6,7,8,14-tetrahydro-6,14-endoethenonororipavine Following the general procedure of Example 61, N-cyclopropylmethyl-7α-(1,1-dimethoxyethyl)-6,7,8,14 - tetrahydro - 6,14 - endoethenonororipavine is heated above its melting point. Isolation of the product gives N-cyclopropylmethyl-7α-(1 - methoxyvinyl)-6,7,8,14-tetrahydro-6,14-endoethenonororipavine.

EXAMPLE 71

Preparation of N-allyl-7α-(1-methoxyvinyl)-6,7,8,14 tetrahydro-6,14-endoethenonororipavine By reacting 7α-(1-methoxyvinyl)-6,7,8,14-tetrahydro-6,14-endoethenonororipavine with allyl chloride in an inert solvent, N-allyl-7α-(1-methoxyvinyl)-6,7,8,14-tetrahydro-6,14-endoethenonororipavine is thereby obtained.

EXAMPLE 72

Preparation of 7α-(1-methoxyvinyl)-6,7,8,14-tetrahydro-6,14-endoethanooripavine

Following the general procedure of Example 61, 7α-(1,1-dimethoxyethyl) - 6,7,8,14 - tetrahydro-6,14-endoethanooripavine is heated above its melting point. Isolation of the product gives 7α-(1-methoxyvinyl)-6,7,8,14-tetrahydro-6,14-endoethanooripavine.

EXAMPLE 73

Preparation of N-cyclopropylmethyl - 7α - (1-methoxyvinyl)-6,7,8,14-tetrahydro-6,14-endoethanonorthebaine Following the general procedure of Example 61, N-cyclopropylmethyl-7α-(1,1 - dimethoxyethyl)-6,7,8,14-tetrahydro - 6,14 - endoethanonorthebaine is heated above its melting point. Isolation of the product gives N-cyclopropylmethyl - 7α - (1-methoxyvinyl)-6,7,8,14 - tetrahydro-6,14-endoethanonorthebaine.

EXAMPLE 74

Preparation of N-cyclopropymethyl - 7α - (1-methoxyvinyl)-6,7,8,14 - tetrahydro-6,14-endoethanonororipavine Following the general procedure of Example 61, N-cyclopropylmethyl-7α-(1,1 - dimethoxyethyl)-6,7,8,14-tetrahydro-6,14-endoethanonororipavine is heated above its melting point. Isolation of the product gives N-cyclopropylmethyl-7α-(1 - methoxyvinyl)-6,7,8,14-tetrahydro-6,14-endoethanonororipavine.

EXAMPLE 75

Preparation of 7β-(1-methoxyvinyl)-6,7,8,14-tetrahydro-6,14-endoethenooripavine

Following the general procedure of Example 61, 7β-(1,1-dimethoxyethyl)-6,7,8,14-tetrahydro - 6,14 - endoethenooripavine is heated above its melting point. Isolation of the product gives 7β-(1-methoxyvinyl)-6,7,8,14-tetrahydro-6,14-endoethenooripavine.

EXAMPLE 76

Preparation of N-cyclopropylmethyl-7β-(1-methoxyvinyl)-6,7,8,14-tetrahydro-6,14-endoethenonorthebaine Following the general procedure of Example 61, N-cyclopropylmethyl - 7β - (1,1-dimethoxyethyl) - 6,7,8,14-tetrahydro-6,14-endoethenonorthebaine is heated above its melting point. Isolation of the product gives N-cyclopropylmethyl - 7β - (1 - methoxyvinyl)-6,7,8,14-tetrahydro-6,14-endoethenonorthebaine.

EXAMPLE 77

Preparation of N-cyclopropylmethyl - 7β - (1-methoxyvinyl)-6,7,8,14-tetrahydro-6,14-endoethenonororipavine Following the general procedure of Example 61, N-cyclopropylmethyl-7β-(1,1 - dimethoxyethyl)-6,7,8,14-tetrahydro-6,14-endoethenonororipavine is heated above its melting point. Isolation of the product gives N-cyclopropylmethyl-7β-(1 - methoxyvinyl)-6,7,8,14-tetrahydro-6,14-endoethenonororipavine.

EXAMPLE 78

Preparation of 7α-acetyl-6,7,8,14-tetrahydro-6,14-endoethenooripavine

7α-(1,1-dimethoxyethyl) - 6,7,8,14 - tetrahydro-6,14-endoethenooripavine (1.5 g.) is dissolved in dilute aqueous hydrochloric acid (5%, 25 ml.). After a few minutes the acidic solution is made basic with sodium bicarbonate and then extracted with methylene chloride. The methylene chloride extract is washed with water and dried. The residue obtained by evaporation of solvent is crystallized from methanol to give 7α-acetyl-6,7,8,14-tetrahydro-6,14-endoethenooripavine (887 mg.), M.P. 215–217° C.

EXAMPLE 79

Preparation of 7α-acetyl-N-cyclopropylmethyl-6,7,8,14-tetrahydro-6,14-endoethenonorthebaine hydrochloride Following the general procedure of Example 78, 7α-(1,1 - dimethoxyethyl) - N - cyclopropylmethyl-6,7,8,14-tetrahydro-6,14-endoethenonorthebaine is dissolved in dilute hydrochloric acid. Extraction of the acidic solution with methylene chloride, followed by isolation of the product, gives 7α - acetyl-N-cyclopropylmethyl-6,7,8,14-tetrahydro - 6,14 - endoethenonorthebaine hydrochloride, M.P. 249–250° C. with dec. when crystallized from acetone.

EXAMPLE 80

Preparation of 7α - acetyl-N-cyclopropylmethyl-6,7,8,14-tetrahydro-6,14-endoethenonororipavine Following the general procedure of Example 78, N-cyclopropylmethyl - 7α - (1,1-dimethoxyethyl) - 6,7,8,14-tetrahydro-6,14-endoethenonororipavine is treated with dilute hydrochloric acid. Neutralization with base then gives 7α-acetyl-N-cyclopropylmethyl-6,7,8,14-tetrahydro-6,14-endoethenonororipavine, M.P. 208–210° C. when crystallized from methanol.

EXAMPLE 81

Preparation of 7α-acetyl-6,7,8,14-tetrahydro-6,14-endoethenooripavine

7α-(1-methoxyvinyl)-6,7,8,14-tetrahydro - 6,14 - endoethenooripavine (ca. 75 mg.) is dissolved in dilute aqueous hydrochloric acid (5%) with slight heating. The acidic solution is allowed to stand at room temperature for 1 hour, and is then filtered from insoluble material, made basic with sodium bicarbonate, and extracted with methylene chloride. The methylene chloride extract is washed with water and dried. The residue obtained by evaporation of solvent is crystallized by trituration with ether and collected with the aid of hexane to give the crude product (28 mg.). Recrystillization from methanol gives 7α-acetyl - 6,7,8-14 - tetrahydro - 6,14 - endoethenooripavine, M.P. 212° C.–214° C.

EXAMPLE 82

Preparation of 7α-acetyl-N-cyclopropylmethyl-6,7,8,14-tetrahydro-6,14-endoethenonorthebaine hydrochloride Following the general procedure of Example 78, 7α-(1-methoxyvinyl)-N-cyclopropylmethyl - 6,7,8,14 - tetrahydro-6,14-endoethenonorthebaine is dissolved in dilute hydrochloric acid. Extraction of the acidic solution with methylene chloride, followed by isolation of the product, gives 7α - acetyl-N-cyclopropylmethyl - 6,7,8,14 - tetrahydro - 6,14 - endoethenonorthebaine hydrochloride, M.P. 249–250° C. with dec. when crystallized from acetone.

EXAMPLE 83

Preparation of 7α-acetyl-N-cyclopropylmethyl-6,7,8,14-tetrahydro-6,14-endoethenonororipavine Following the general procedure of Example 78, N-cyclopropylmethyl-7α-(1-methoxyvinyl) - 6,7,8,14 - tetrahydro-6,14-endoethenonororipavine is treated with dilute hydrochloric acid. Neutralization with base then gives 7α-acetyl-N-cyclopropylmethyl - 6,7,8,14 - tetrahydro - 6,14 - endoethenonororipavine, M.P. 208–210° C. when crystallized from methanol.

EXAMPLE 84

Preparation of 7α-acetyl-6,7,8,14-tetrahydro-6,14-endoethanooripavine

Following the general procedure of Example 78, 7α-(1,1-dimethoxyethyl) - 6,7,8,14 - tetrahydro - 6,14-endoethanooripavine is treated with dilute hydrochloric acid. Neutralization with base then gives 7α-acetyl-6,7,8,14-tetrahydro-6,14-endoethanooripavine.

EXAMPLE 85

Preparation of 7α-acetyl-N-cyclopropylmethyl-6,7,8,14-tetrahydro-6,14-endoethanonorthebaine Following the general procedure of Example 78, 7α-(1,1 - dimethoxyethyl) - N - cyclopropylmethyl - 6,7,8,14 - tetrahydro-6,14-endoethanonorthebaine is dissolved in dilute hydrochloric acid. Neutralization followed by isolation of the product gives 7α-acetyl-N-cyclopropylmethyl-6,7,8,14-tetrahydro-6,14-endoethanonorthebaine.

EXAMPLE 86

Preparation of 7α-acetyl-N-cyclopropylmethyl-6,7,8,14-tetrahydro-6,14-endoethanonororipavine Following the general procedure of Example 78, N-cyclopropylmethyl - 7α - (1,1 - dimethoxyethyl) - 6,7,8,14 - tetrahydro-6,14-endoethanonororipavine is treated with dilute hydrochloric acid. Neutralization with base then gives 7α - acetyl-N-cyclopropyl-methyl - 6,7,8,14 - tetrahydro-6,14-endoethanonororipavine.

EXAMPLE 87

Preparation of 7β-acetyl-6,7,8,14-tetrahydro-6,14-endoethenooripavine

Following the general procedure of Example 78, 7β-(1,1-dimethoxyethyl) - 6,7,8-14 - tetrahydro - 6,14-endoethenooripavine is treated with dilute hydrochloric acid. Neutralization with base then gives 7β-acetyl-6,7,8,14-tetrahydro-6,14-endoethenooripavine.

EXAMPLE 88

Preparation of 7α-acetyl-N-cyclopropylmethyl-6,7,8,14-tetrahydro-6,14-endoethenonorthebaine Following the general procedure of Example 78, 7β-(1,1-dimethoxyethyl) - N - cyclopropylmethyl - 6,7,8,14-tetrahydro-6,14-endoethenonorthebaine is dissolved in dilute hydrochloric acid. Neutralization followed by isolation of the product gives 7β-acetyl-N-cyclopropylmethyl, 6,7,8,14-tetrahydro-6,14-endoethenonorthebaine.

EXAMPLE 89

Preparation of 7α-(2-formyl-1-methoxyvinyl)-6,7,8,14-tetrahydro-6,14-endoethenothebaine A solution of phosgene (20 g.) in methylene chloride (200 ml.) is added rapidly dropwise with stirring to a mixture of dimethyl formamide (200 ml.; dried over molecular sieves) and methylene chloride (600 ml.). The mixture is stirred for a further 15 minutes after the addition is complete. A solution of 7α-(1,1,-dimethoxyethyl)-6,7,8,14-tetrahydro-6,14-endoethenothebaine (19.4 g.) in methylene chloride (200 ml.) and pyridine (10 ml.) is then added in a slow stream and the mixture is stirred for 45 minutes. Aqueous sodium acetate (1200 ml.; 5%) is then added and the mixture is stirred vigorously for 30 minutes. If necessary, the mixture is adjusted to pH 8 by the addition of aqueous sodium bicarbonate and the layers are separated. The aqueous layer is washed with methylene chloride and is then made strongly alkaline with sodium hydroxide solution (10%). The mixture is extracted with ether and the extract is washed with water and dried. Evaporation of solvent followed by crystallization of the residue from acetone-n-hexane gives 7α-(2-formyl-1-methoxyvinyl) - 6,7,8,14 - tetrahydro-6,14-endoethenothebaine (15.37 g.), M.P. 152–153° C. A further amount (1.42 g.), M.P. 150–152° C., is obtained from the mother liquor to give a total yield of 87%.

EXAMPLE 90

Preparation of N - cyclopropylmethyl - 7α - (2-formyl-1-methoxyvinyl)-6,7,8,14 - tetrahydro - 6,14 - endoethenonorthebaine hydrochloride A solution of phosgene (1 g.) in methylene chloride (10 ml.) is added rapidly dropwise with stirring to a mixture of dimethylformamide (10 ml.; dried over molecular sieves) and methylene chloride (30 ml.). The mixture is stirred for a further 15 minutes after the addition is complete. A solution of N - cyclopropylmethyl - 7α - (1,1 dimethoxyethyl) - 6,7,8,14 - tetrahydro - 6,14 - endoethenonorthebaine (1 g.) in mythlene chloride (10 ml.) and pyridine (0.5 ml.) is then added in a slow stream, and the mixture is stirred at room temperature for 45 minutes. Aqueous sodium hydroxide (60 ml.; 5%) is then added, and the mixture is stirred vigorously for 30 minutes. The layers are separated and the organic phase is washed with water and dried. The oil obtained by evaporation of solvent is dissolved in dilute hydrochloric acid (5%), and the solution is washed with ether and extracted with methylene chloride. The extract is dried and evaporated. Acetone is added to cause crystallization and the material is collected with the aid of ether to give N-cyclopropylmethyl - 7α - (2-formyl-1-methoxyvinyl) - 6,7,8,14-tetrahydro - 6,14 - endoethenonorthebaine hydrochloride (835 mg.), M.P. 213–215° C.

EXAMPLE 91

Preparation of 7α-(2-formyl-1-methoxyvinyl)-6,7,8,14-tetrahydro-6,14-endoethenooripavine Following the general procedure of Example 90, 7α-(1,1-dimethoxyethyl) - 6,7,8,14 - tetrahydro - 6,14-endoethenooripavine is treated with phosgene-dimethylformamide followed by hydrolysis to give 7α-(2-formyl-1-methoxyvinyl)-6,7,8,14-tetrahydro - 6,14 - endoethenooripavine.

EXAMPLE 92

Preparation of N-cyclopropylmethyl - 7α - (2-formyl-1-methoxyvinyl)-6,7,8,14-tetrahydro - 6,14 - endoethenonororipavine Following the general procedure of Example 90, N-cyclopropylmethyl-7α-(1,1-dimethoxyethyl - 6,7,8,14 - tetrahydro - 6,14 - endoethenonororipavine is treated with phosgene-dimethylformamide followed by hydrolysis to give N-cyclopropylmethyl-7α-(2-formyl-1-methoxyvinyl)-6,7,8,14-tetrahydro-6,14-endoethenonororipavine.

EXAMPLE 93

Preparation of N-cyclopropylmethyl - 7α - (2-formyl-1-methoxyvinyl) - 6,7,8,14 - tetrahydro-6,14-endoethenonororipavine Following the general procedure of Example 90, N-cyclopropylmethyl-7α-(1-methoxyvinyl) - 6,7,8,14 - tetrahydro-6,14-endoethenonororipavine is treated with phosgene-dimethylformamide followed by hydrolysis to give N-cyclopropylmethyl-7α-(2-formyl - 1 - methoxyvinyl)-6,7,8,14-tetrahydro-6,14-endoethenonororipavine.

EXAMPLE 94

Preparation of N-cyclopropylmethyl - 7α - (2-formyl-1-methoxyvinyl) - 6,7,8,14 - tetrahydro-6,14-endoethanonororipavine Following the general procedure of Example 90, N-cyclopropylmethyl-7α-(1,1-dimethoxyethyl) - 6,7,8,14 - tetrahydro - 6,14 - endoethanonororipavine is treated with phosgene-dimethylformamide followed by hydrolysis to give N-cyclopropylmethyl-7α-(2-formyl-1-methoxyvinyl)-6,7,8,14-tetrahydro-6,14-endoethanonororipavine.

EXAMPLE 95

Preparation of N-cyclopropylmethyl - 7β - (2-formyl-1-methoxyvinyl) - 6,7,8,14 - tetrahydro-6,14-endoethenonororipavine Following the general procedure of Example 90, N-cyclopropylmethyl-7β-(1,1 - dimethoxyethyl)-6,7,8,14-tetrahydro-16,14-endoethenonororipavine is treated with phosgenedimethylformamide followed by hydrolysis to give N-cyclopropylmethyl-7β-(2 - formyl-1-methoxyvinyl)-6,7,8,14-tetrahydro-6,14-endoethenonororipavine.

EXAMPLE 96

Preparation of N-cyclopropylmethyl - 7α - (1-phenyl-5-pyrazolyl) - 6,7,8,14 - tetrahydro-6,14-endoethenonororipavine citrate N-cyclopropylmethyl - 7α - (2-formyl-1-methoxyvinyl)-6,7,8,14-tetrahydro-6,14 - endoethenonororipavine (5 g.), phenylhydrazine hydrochloride (2.5 g.), and acetic acid (100 ml.) are heated on the steam bath for 30 minutes. The mixture is diluted with water and is then made basic with ammonium hydroxide. The material which separates is collected and dried via methylene chloride solution followed by evaporation of solvent to give a glass. A solution of this glass in methylene chloride is passed through a short column of Magnesol®. Evaporation of the eluate gives a gum which crystallizes on the addition of ether, and is collected with the aid of ether to give N-cyclopropylmethyl - 7α - (1-phenyl-5-pyrazolyl)-6,7,8,14-tetrahydro-6,14-endoethenonororipavine (2.8 g., 43%), M.P. 184–186° C. The compound has $$\lambda_{max}^{CH_3OH} 242 \text{ (inflection point; } \epsilon 13{,}300\text{) and } 289 \text{ m}\mu \text{ (}\epsilon 9000\text{)}$$

A hot solution of citric acid (1.5 g.) in ethanol (5 ml.) is added to a hot solution of pyrazole (1.5 g.) in ethanol (15 ml.). N-cyclopropylmethyl-7α - (1-phenyl-5-pyrazolyl)-6,7,8,14-tetrahydro - 6,14 - endoethenonororipavine citrate (1.416 g.), M.P. 216° C. dec., separates on standing for several hours. The mother liquor is warmed and ether is added, when a further amount (450 mg.) of product, M.P. 217° C. dec., separates to give a total yield of 98%. The compound has $$\lambda_{max}^{KBr} 2.93, 3.85 \text{ (broad)}$$

5.74, 5.82 (shoulder), and 6.25μ; nuclear magnetic resonance ($d_6$-DMSO) δ 7.50 and 6.13 (pyrazole $C_3'$-H and $C_4'$-H, doublets, $J_{3',4'}$=1.8 cps.), 5.83 and 5.72 ($C_{18}$-H and $C_{17}$-H; doublets, $J_{17,18}$=9 cps.), 4.48 ($C_5$-H), 3.08 ($C_6$-methoxyl), and 2.70 (—CH$_2$— of citrate; 2 protons or one mole of citric acid per mole of thebaine derivative).

EXAMPLE 97

Preparation of N-cyclopropylmethyl - 7α - [1-(m-chlorophenyl) - 5 - pyrazolyl]-6,7,8,14-tetrahydro-6,14-endoethenonororipavine Following the general procedure of Example 96, N-cyclopropylmethyl-7α-(2 - formyl-1-methoxyvinyl)-6,7,8,14-tetrahydro-6,14-endoethenonororipavine is treated with m-chlorophenyl hydrazine hydrochloride in acetic acid to give to N-cyclopropylmethyl-7α-[1 - (m-chlorophenyl)-5-pyrazolyl] - 6,7,8,14 - tetrahydro-6,14-endoethenonororipavine. The hydrochloride crystalizes from ethanol and has M.P. 281–282° C. dec. The compound has nuclear magnetic resonance (CDCl$_3$/$d_6$-DMSO) δ 7.48 and 6.08 (pyrazole $C_3'$-H and $C_4'$-H, doublets, $J_{3',4'}$=1.7 cps.).

EXAMPLE 98

Preparation of N-cyclopropylmethyl-7α-[1 - (m-fluorophenyl)-5-pyrazolyl] - 6,7,8,14 - tetrahydro-6,14-endoethenonororipavine Following the general procedure of Example 96, N-cyclopropylmethyl - 7α - (2-formyl-1-methoxyvinyl)-6,7,8, 14-tetrahydro - 6,14 - endoethenonororipavine is treated with m-fluorophenylhydrazine hydrochloride in acetic acid to give N-cyclopropylmethyl - 7α - [1-(m-fluorophenyl)-5 - pyrazolyl] - 6,7,8,14 - tetrahydro-6,14-endoethenonororipavine.

EXAMPLE 99

Preparation of N-cyclopropylmethyl - 7α - [1-(m-bromophenyl)-5-pyrazolyl]-6,7,8,14-tetrahydro - 6,14 - endoethenonororipavine Following the general procedure of Example 96, N-cyclopropylmethyl-7α-(2 - formyl-1-methoxyvinyl)-6,7,8,14-tetrahydro-6,14-endoethenonororipavine is treated with m-bromophenylhydrazine hydrochloride in acetic acid to give N-cyclopropylmethyl - 7α - [1-m-bromophenyl)-5-pyrazolyl] - 6,7,8,15 - tetrahydro-6,14-endoethenonororipavine.

EXAMPLE 100

Preparation of N-cyclopropylmethyl - 7α - [1-(m-tolyl)-5 - pyrazolyl]-6,7,8,14-tetrahydro-6,14-endoethenonororipavine Following the general procedure of Example 96, N-cyclopropylmethyl-7α-(2-formyl - 1 - methoxyvinyl)-6,7,8,14 - tetrahydro-6,14-endoethenonororipavine is treated with m-tolylhydrazine hydrochloride in acetic acid to give N-cyclopropylmethyl - 7α - [1-(m-tolyl)-5-pyrazolyl]-6,7,8,14-tetrahydro-6,14-endoethenonororipavine.

EXAMPLE 101

Preparation of N-cyclopropylmethyl - 7α - [1-(m-chlorophenyl) - 5 - pyrazolyl]-6,7,8,14-tetrahydro-6,14-endoethanonororipavine Following the general procedure of Example 96, N-cyclopropylmethyl - 7α - (2-formyl - 1 - methoxyvinyl)-6,7,8,14 - tetrahydro-6,14-endoethanonororipavine is treated with m-chlorophenyl hydrazine hydrochloride in acetic acid to give N-cyclopropylmethyl-7α-[1-(m-chlorophennyl)-5-pyrazolyl]-6,7,8,14-tetrahydro - 6,14 - endoethanonororipavine.

EXAMPLE 102

Preparation of N-cyclopropylmethyl - 7β - [1-(m-chlorophenyl) - 5 - pyrazolyl]-6,7,8,14-tetrahydro-6,14-endoethenonororipavine Following the general procedure of Example 96, N-cyclopropylmethyl - 7β - (2-formyl-1-methoxyvinyl)-6,7,8,14-tetrahydro-6,14-endoethenonororipavine is treated with m-chlorophenyl hydrazine hydrochloride in acetic acid to give N-cyclopropylmethyl - 7β - [1-m-chlorophenyl)-5-pyrazolyl]-6,7,8,14-tetrahydro - 6,14 - endoethenonororipavine.

We claim:
1. A compound selected from the group consisting of those of the formula:

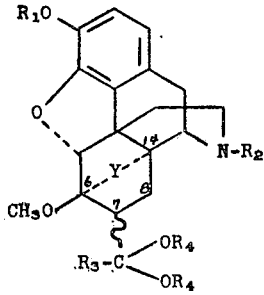

wherein $R_1$ is selected from the group consisting of hydrogen, lower alkyl and lower alkanoyl; $R_2$ is selected from the group consisting of hydrogen, cyano, propargyl, lower alkyl, phenyl lower alkyl, lower alkenyl and lower cycloalkylmethyl; $R_3$ is selected from the group consisting of hydrogen, phenyl and alkyl of from 1 to 8 carbon atoms; $R_4$ is lower alkyl; and Y is selected from the group consisting of etheno and ethano; the nontoxic pharmaceutically acceptable acid-addition salts thereof; and the alkali metal phenolates thereof when $R_1$ is hydrogen.

2. A compound according to claim 1 wherein $R_1$, $R_2$, $R_3$ and $R_4$ are methyl; Y is etheno; and the configuration at the 7-position is alpha.

3. A compound according to claim 1 wherein $R_1$ is hydrogen; $R_2$, $R_3$ and $R_4$ are methyl; Y is etheno; and the configuration at the 7-position is alpha.

4. A compound according to claim 1 wherein $R_1$, $R_3$ and $R_4$ are methyl; $R_2$ is cyano; Y is etheno; and the configuration at the 7-position is alpha.

5. A compound according to claim 1 wherein $R_1$, $R_3$ and $R_4$ are methyl; $R_2$ is hydrogen; Y is etheno; and the configuration at the 7-position is alpha.

6. A compound according to claim 1 wherein $R_1$, $R_3$ and $R_4$ are methyl; $R_2$ is cyclopropylmethyl; Y is etheno; and the configuration at the 7-position is alpha.

7. A compound according to claim 1 wherein $R_1$ is hydrogen; $R_2$ is cyclopropylmethyl; $R_3$ and $R_4$ are methyl; Y is etheno; and the configuration at the 7-position is alpha.

8. A compound selected from the group consisting of those of the formula:

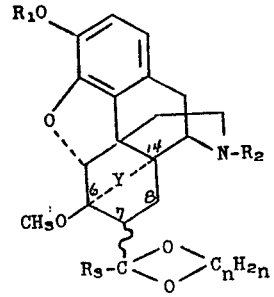

wherein $R_1$ is selected from the group consisting of hydrogen, lower alkyl and lower alkanoyl; $R_2$ is selected from the group consisting of hydrogen, cyano, propargyl, lower alkyl, phenyl lower alkyl, lower alkenyl and lower cycloalkylmethyl; $R_3$ is selected from the group consisting of hydrogen, phenyl and alkyl of from 1 to 8 carbon atoms; $n$ is selected from the group consisting of 2 and 3; and Y is selected from the group consisting of etheno and ethano; the nontoxic pharmaceutically acceptable acid-addition salts thereof; and the alkali metal phenolates thereof when $R_1$ is hydrogen.

9. A compound according to claim 8 wherein $R_1$, $R_2$ and $R_3$ are methyl; $n$ is 2; Y is etheno; and the configuration at the 7-position is alpha.

10. A compound according to laim 8 wherein $R_1$ is hydrogen; $R_2$ is methyl; $R_3$ is propyl; $n$ is 2; Y is etheno; and the configuration at the 7-position is alpha.

References Cited

UNITED STATES PATENTS

| | | | |
|---|---|---|---|
| 3,285,914 | 11/1966 | Gordon | 260—285 |
| 3,433,791 | 3/1969 | Bentley | 260—285 |
| 3,442,900 | 3/1969 | Bentley | 260—285 |
| 3,474,101 | 10/1969 | Bentley | 260—285 |
| 3,474,103 | 10/1969 | Brown et al. | 260—285 |

FOREIGN PATENTS

| | | | |
|---|---|---|---|
| 902,659 | 8/1962 | Great Britain | 260—285 |

DONALD G. DAUS, Primary Examiner

U.S. Cl. X.R.

260—478, 544; 424—260